United States Patent
Yotsumoto et al.

(10) Patent No.: US 6,836,947 B2
(45) Date of Patent: Jan. 4, 2005

(54) METHOD OF DISMANTLING AIR CONDITIONER

(75) Inventors: Mikio Yotsumoto, Ibaraki (JP); Yutaka Matsuda, Takarazuka (JP); Takayuki Gyoubu, Otokuni-gun (JP); Katsuya Sawada, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 373 days.

(21) Appl. No.: 10/129,062

(22) PCT Filed: Aug. 13, 2001

(86) PCT No.: PCT/JP01/07010

§ 371 (c)(1),
(2), (4) Date: Apr. 30, 2002

(87) PCT Pub. No.: WO02/18842

PCT Pub. Date: Mar. 7, 2002

(65) Prior Publication Data

US 2002/0162207 A1 Nov. 7, 2002

(30) Foreign Application Priority Data

Aug. 30, 2000 (JP) ........................................ 2000-260967

(51) Int. Cl.⁷ ............................................... B23P 19/02
(52) U.S. Cl. ............................... 29/426.4; 29/890.031; 29/403.3; 83/52; 241/27
(58) Field of Search ..................... 29/890.031, 890.035, 29/403.1, 403.3, 402.03, 426.4; 241/27, 193, 194, 195; 83/835, 846, 52, 54

(56) References Cited

U.S. PATENT DOCUMENTS

| | | | |
|---|---|---|---|
| 1,821,482 A | * | 9/1931 | Schutte ........................ 241/194 |
| 2,045,690 A | * | 6/1936 | Armstrong .................. 241/194 |
| 2,159,439 A | | 5/1939 | Leighton |
| 2,244,577 A | * | 6/1941 | Schreiber ..................... 241/194 |
| 3,504,621 A | | 4/1970 | Qualheim |
| 3,645,199 A | | 2/1972 | Kanna |
| 3,931,793 A | | 1/1976 | Kolibas |
| 4,531,950 A | | 7/1985 | Burt |
| 4,723,507 A | | 2/1988 | Ovshinsky et al. |
| 5,443,216 A | * | 8/1995 | Lajoie ......................... 241/194 |
| 5,826,631 A | | 10/1998 | Gold et al. |
| 6,131,509 A | | 10/2000 | Davis |
| 6,203,113 B1 | * | 3/2001 | Wendel ....................... 299/100 |
| 6,598,813 B1 | * | 7/2003 | Matsuda ...................... 241/27 |
| 2002/0153439 A1 | * | 10/2002 | Yotsumoto et al. .... 241/101.76 |
| 2003/0029562 A1 | * | 2/2003 | Yotsumoto et al. ......... 156/344 |
| 2003/0131707 A1 | * | 7/2003 | Yotsumoto et al. ............ 83/52 |
| 2003/0167890 A1 | * | 9/2003 | Matsuda .................... 83/471.1 |
| 2004/0103514 A1 | * | 6/2004 | Yotsumoto et al. ........ 29/426.4 |

FOREIGN PATENT DOCUMENTS

| | | |
|---|---|---|
| DE | 41 33 592 | 4/1993 |
| EP | 0 949 068 | 10/1999 |
| JP | 51-22775 | 2/1976 |
| JP | 56-98134 | 8/1981 |
| JP | 3-500857 | 2/1991 |
| JP | 8-5232 | 1/1996 |
| JP | 9-68325 | 3/1997 |
| JP | 9-68329 | 3/1997 |
| JP | 9-300127 | 11/1997 |
| JP | 52-136457 | 11/1997 |
| JP | 11-314084 | 11/1999 |
| JP | 2000-102923 | 4/2000 |

* cited by examiner

Primary Examiner—David P. Bryant
(74) Attorney, Agent, or Firm—Merchant & Gould P.C.

(57) ABSTRACT

Using a cutting device (10) including a rotor (11) with a principal plane, a spindle (13) provided in a normal direction to the principal plane and at least one impacting body (100) mounted on the spindle rotatably, in which the impacting body is mounted so that a predetermined fitting gap is provided between the impacting body and the spindle and a part of a periphery of the impacting body can be positioned beyond a periphery of the rotor, the rotor is rotated at a high speed so as to allow the impacting body to impact on at least a heat exchanger of an air conditioner at least at a critical impact velocity. The heat exchanger is cut while a top layer of an impact portion being smashed. It is possible to disassemble an air conditioner efficiently using a cutting device having a simple configuration and a long lifetime.

24 Claims, 30 Drawing Sheets

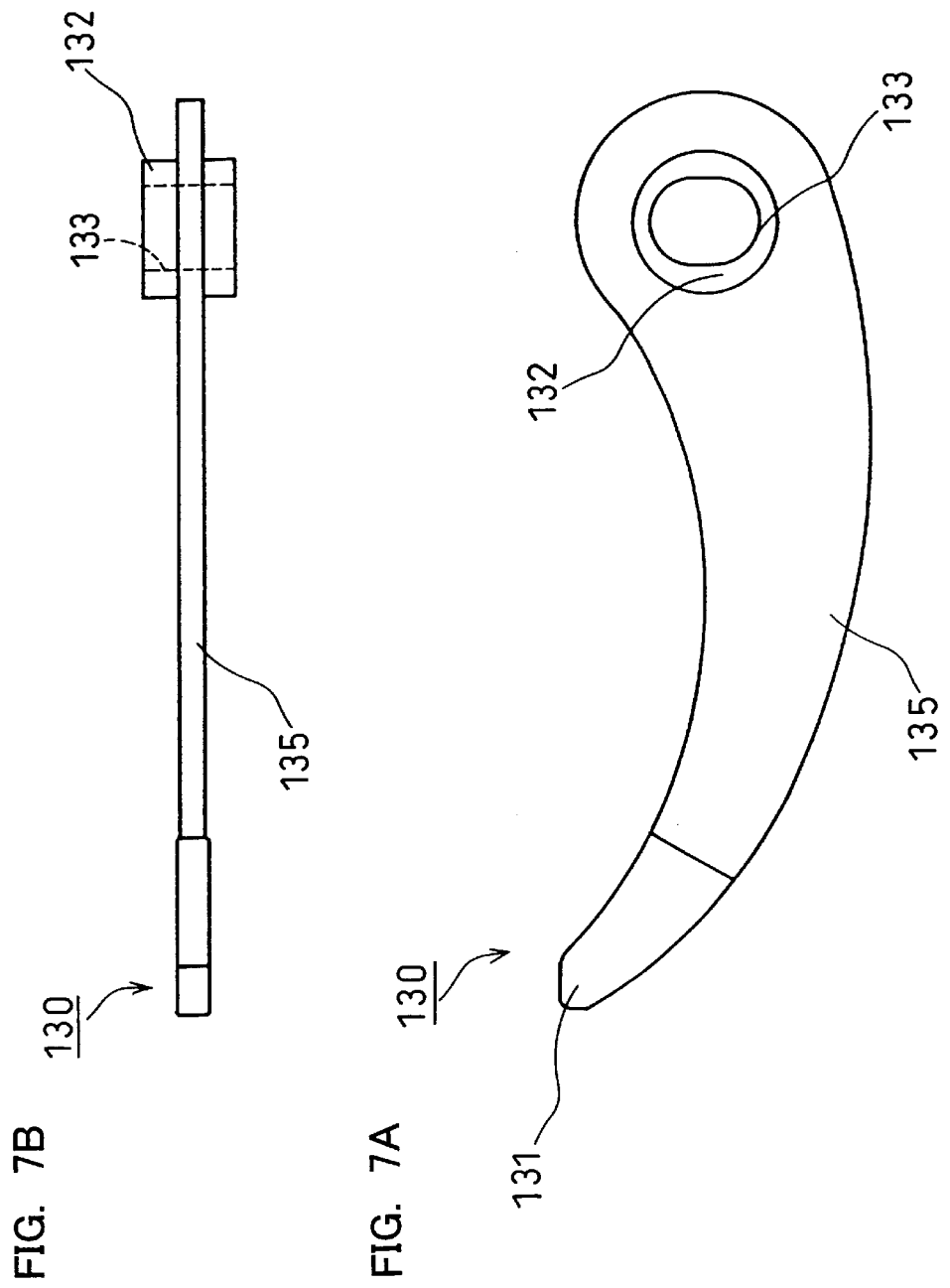

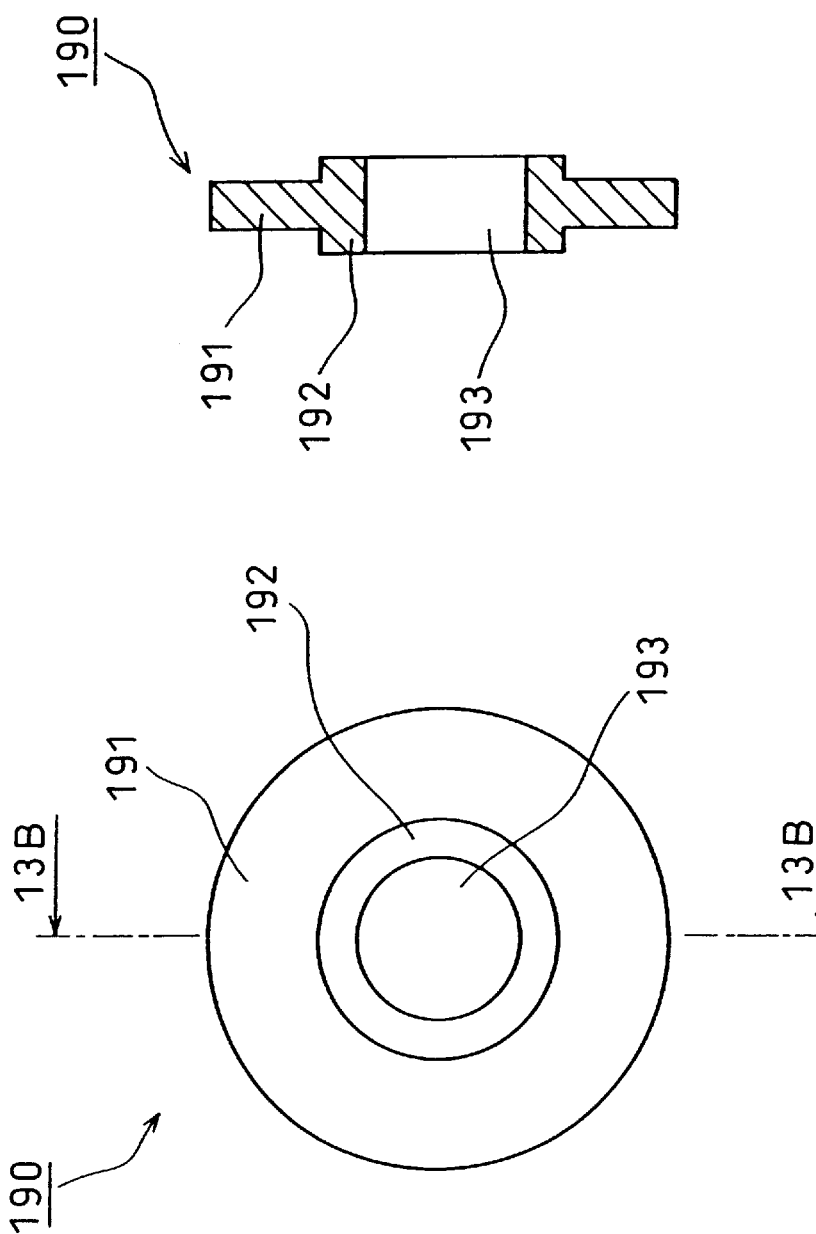

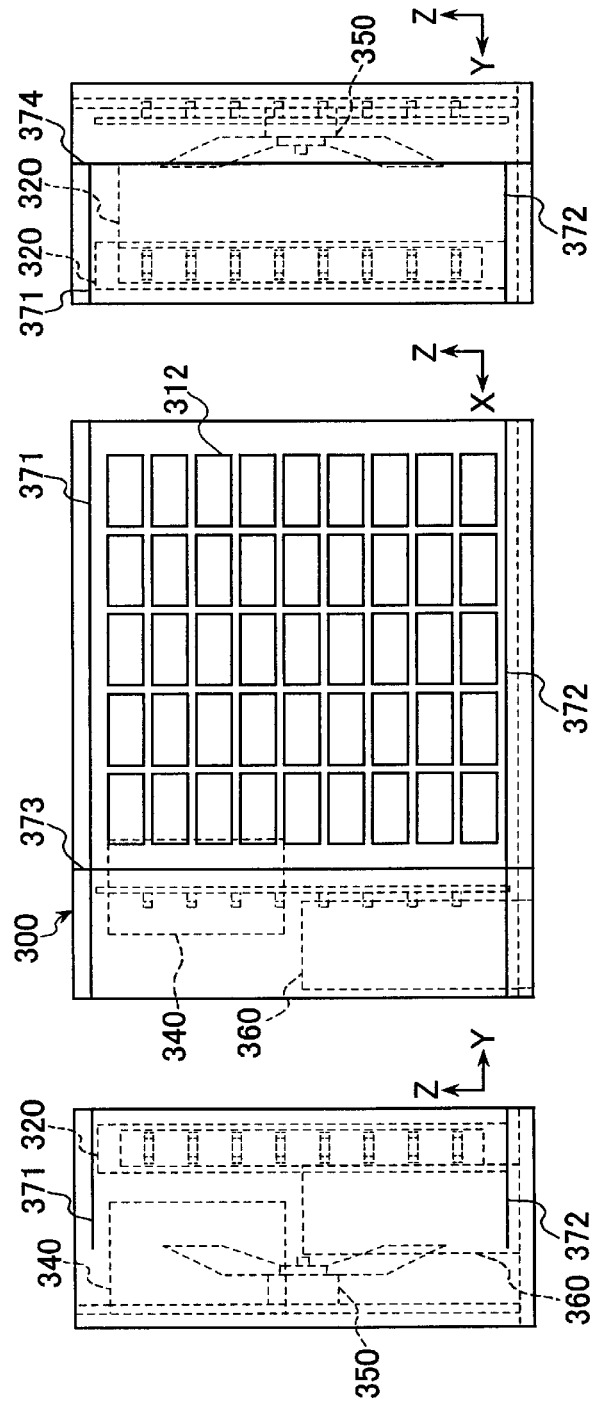
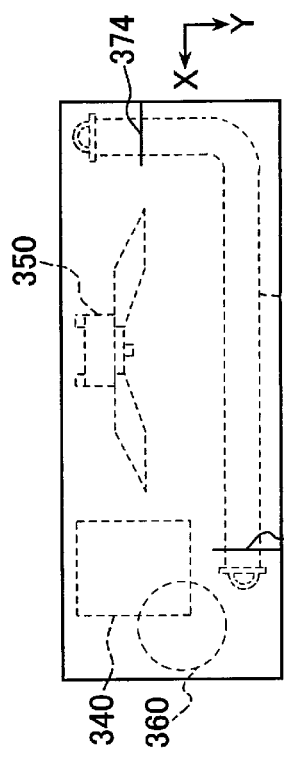

METHOD OF DISMANTLING AIR CONDITIONER

TECHNICAL FIELD

The present invention relates to a method for disassembling a discarded air conditioner.

BACKGROUND ART

An air conditioner generally includes an outdoor unit and an indoor unit. The outdoor unit has a heat exchanger, a compressor, a fan, a motor for driving this fan, a printed circuit board and a housing for containing these elements. The indoor unit has a heat exchanger, a fan, a motor for driving this fan, a printed circuit board and a housing for containing these elements. In order to eliminate harm to the environment and collect a valuable material efficiently, a discarded air conditioner is separated into main elements and then smashed and collected according to each element.

As a method for disassembling an air conditioner, the following methods are known, for example.

JP 9(1997)-68325 A discloses a method for cutting and separating a heat exchanger from an indoor unit of an air conditioner by using a cutting machine such as a band saw machine.

Furthermore, JP 9(1997)-68329 A discloses a method for cutting a bottom plate of a housing of an outdoor unit and separating a compressor by using an acetylene gas cutting machine.

Moreover, JP 9(1997)-300127 A discloses a method for cutting and disassembling an outdoor unit by pressing in a shear-type cutting blade.

Other than the above methods, there are some cases where a disc-shaped cutter (a metal slitting saw), a diamond wheel cutter and a grinding tool (a grinder) in which abrasive grains are formed in a disc shape or in a cylindrical shape are used for cutting and separating.

However, the conventional separating methods described above have the following problems.

When using a tool such as a band saw machine or a metal slitting saw, a cutting blade of the tool is pressed strongly against an object to be cut ("an object to be processed"; referred to as "a workpiece" in the following) to cause a continuous shear fracture in the workpiece, thus cutting/processing this workpiece. Since the cutting blade is pressed strongly against the workpiece, frictional heat is generated greatly at the cutting portion. Therefore, the embrittlement and enfeeblement of its cutting edge due to the heat aggravate the abrasion of the cutting edge. Due to the abrasion of the cutting blade, the cutting speed is lowered considerably and thus is limited. In addition, since the cutting blade is allowed to bite into the workpiece, a high stiffness is needed for holding the tool and the workpiece, thus requiring a large-scale holding mechanism and a high equipment cost.

In the gas cutting using a gas such as acetylene, the cutting speed is slow, and if the workpiece itself is combustible or combustibles are present in the vicinity of the cutting section, the cutting is dangerous, so this method has limited utility.

Furthermore, the press-cutting with the shear-type cutting blade needs a great power for holding and moving the blade and holding the workpiece, thus requiring a large-scale apparatus. In addition, the cutting blade easily becomes chipped and worn away.

In the cutting method using a diamond wheel cutter, when the cutting speed is raised, the wear rate of the diamond wheel cutter increases due to frictional heat and therefore the cutting speed is limited. In addition, the diamond wheel cutter is expensive, and the cutting amount and the wear rate of the diamond wheel have a close relationship, resulting in high cutting cost.

The grinder cutting using a grindstone is carried out by causing continuous small shears by cutting surfaces of the abrasive grains. Since the corners (cutting blades) of the abrasive grains are not so sharp and the peripheral speed of the grinder is relatively high, the frictional heat generated at the cutting part is great. In order to secure the lifetime of the grindstone, it is necessary to control the temperature of the cutting part appropriately. Thus, the cutting speed is limited.

In the case where a workpiece including a resin material is cut using a band saw machine, a metal slitting saw, or the like, when the cutting speed is raised, the vicinity of the cutting portion of the workpiece starts burning or melts due to the frictional heat generated by the friction with the tool, thus causing a change in physical properties of the workpiece.

In the case where a workpiece including a metallic magnetic component is cut using a blade made of a material containing a ferroalloy as a main constituent, the fragments and powder that are produced by cutting the workpiece are magnetic substances and thus adhere to the edge of the blade. Consequently, the increase in frictional resistance or the damage to the edge lowers the cutting performance of the blade considerably.

Furthermore, it is extremely difficult to cut a workpiece formed of a plurality of members with different physical properties (for example, metal, resin-molded articles or the like) continuously using the same tool.

When the information required for cutting and processing a workpiece (physical properties or the like) is unknown or when a workpiece is formed of a plurality of members and the shapes and materials of the members hiding behind the surface member are unknown, optimal cutting conditions cannot be found out merely from the image information of the surface and outer shape of the workpiece. Therefore, the automatic control for optimal cutting is impossible.

DISCLOSURE OF INVENTION

It is an object of the present invention to solve the problems of the conventional cutting methods described above and to provide a method for disassembling an air conditioner that allows efficient cutting and separating using one kind of a cutting tool.

In order to achieve the above-mentioned object, the present invention is obtained by putting a theory into practical use as a cutting method; the theory is a plastic wave theory in which, when a high-speed tensile force is applied at least at a critical impact velocity, a fracture occurs immediately at the part where the force has been applied, or a theory in which when a high-speed compressive force is applied at least at a critical impact velocity, the ductility is deteriorated rapidly and thus the part where the force has been applied is broken even by a small distortion (a phenomenon similar to the embrittlement).

More specifically, instead of a conventional tool provided with a blade, an impacting body formed of a hard solid body such as metal is allowed to impact on a workpiece at a very high speed with a high frequency to generate a plastic wave by the impact energy, thus breaking and removing the part subjected to the impact instantaneously.

In other words, the present invention uses a cutting method based on the following principle: when an impacting body that executes a high speed circular motion impacts on a workpiece at least at the critical impact velocity of the workpiece and then bounces (rebounds), the surface of the workpiece in a highly limited portion including the part subjected to the impact by the impacting body and its vicinity is smashed (broken) instantaneously into a minute granular state or minute fragments by a high speed compression that occurs together with impact, a high speed tension due to friction, high speed shearing, or the like.

Generally, in processing a workpiece, external forces such as a tensile force, a compressive force or a shearing force are applied to the workpiece by the movement of a tool and thus the workpiece is distorted or deformed. In this case, when the speed of the tool, i.e., the processing speed is increased gradually and reaches a certain limitation, the ductility of the workpiece deteriorates rapidly. This limitation speed is called the critical impact velocity. In the workpiece, the part subjected to the force applied by a tool is broken immediately when the processing speed is increased to the critical impact velocity or more. When utilizing this, by allowing an impacting body to impact on the workpiece at least at the critical impact velocity, only the very surface portion of the workpiece that is subjected to the impact by the impacting body can be broken and removed. By setting an extremely large number of impacts by the impacting body per unit time, this phenomenon can be created repeatedly. Furthermore, by successively changing the position at which the impacting body impacts, only the part on which the impacting body impacts can be removed and processed successively without breaking the portions in the workpiece other than that part. Macroscopically, this can be considered as cutting and processing of the workpiece. According to this cutting method, a relatively smooth cut surface can be obtained.

In order to generate a plastic wave, the impacting body has to impact on a workpiece at least at the critical impact velocity of the workpiece. More specifically, in general, the impact velocity preferably is set to be at least about 139 m/second (about 500 km/hour), more preferably at least about 340 m/second (about 1224 km/hour).

When converted to the peripheral speed of a disc with a diameter of 100 mm, the above-mentioned impact velocities correspond to rotational speeds of at least 26,500 rpm and of at least 65,130 rpm, respectively.

In practice, the critical impact velocity varies depending on the kind of a workpiece. For instance, the critical impact velocities of aluminum, soft steel, stainless steel and titanium are about 49.7 m/second, 30.0 m/second, 152.3 m/second, and 61.8 m/second, respectively. Therefore, the impact velocity of the impacting body can be changed according to the kind of workpiece. The impact velocity of the impacting body preferably is set to be at least twice, further preferably at least three times, and particularly preferably at least four times as high as the critical impact velocity of the workpiece, because this allows stable cutting.

The impacting body has a through hole and is maintained rotatably by a spindle provided perpendicularly on a rotor with a predetermined fitting gap being provided between the impacting body and the spindle. By providing the fitting gap, it is possible to absorb the displacement of the impacting body that occurs right after the impacting body has impacted on a workpiece. Preferably, the fitting gap between the spindle for supporting the impacting body and the through hole of the impacting body is set to be at least 2 mm, more preferably about 5 to 10 mm. It is preferable that the fitting gap is designed to be larger along with an increase in impact velocity of the impacting body. The fitting gap according to the present invention is far beyond the gap value according to the Japanese Industrial Standard (JIS), which generally defines the fitting state between an axis and a bearing, and is two to three orders of magnitude larger than the gap value.

As described above, the processing principle of the present invention is different from a conventional processing principle by utilizing impact. In the conventional processing principle, a cutting blade of a cutting tool is allowed to collide with a workpiece at a low speed (a maximum of about 10 m/second) and the workpiece is deformed in a sequence from elastic deformation through plastic deformation to breakage, thus breaking the surface of the workpiece in a relatively large area.

The impacting body of the present invention is not provided with a sharp cutting blade as in the conventional cutting tool.

The cutting according to the present invention based on the above-mentioned principle is characterized as follows.

(1) According to the smashing (cutting) principle utilizing the high speed compression and high speed tension at least at a critical impact velocity when the impacting body impacts on a workpiece, an extremely small amount of frictional heat is generated only at the part to be cut in the workpiece. In addition, the impacting body is air-cooled rapidly by its quick movement and thus the increase in temperature of the impacting body itself also is extremely small.

(2) A cutting tool that executes a rotational motion, a reciprocating motion, or a rectilinear motion is heavily worn away. On the other hand, the impacting body of the present invention is subjected to work hardening by the impact on a workpiece and therefore is hardened as it is used, thus increasing its abrasion resistance.

(3) In the processing principle of the present invention, the cutting resistance and the frictional resistance are low. As a result, a workpiece does not have to be held and fixed firmly during cutting. In addition, it is not necessary to provide a high stiffness for a spindle for supporting the impacting body, a rotor that rotates at a high speed, a main shaft, a bearing and a robot for holding the main shaft of the rotor.

(4) By mounting an oscillation detector for detecting an intrinsic oscillatory waveform (or an intrinsic oscillation frequency), which is generated by a rotor depending on the nature of the workpiece when cutting the workpiece, on a multi-axis control robot, processing conditions (the impact velocity of the impacting body, the moving speed, etc.) can be controlled depending on the workpiece to be processed.

(5) Even when a workpiece is formed of a plurality of different members (for example, metal, a resin-molded article, glass or ferrite) and the inside of the workpiece cannot be seen from the outside, the workpiece can be cut continuously using the same cutting device.

As described above, the cutting device of the present invention has a simple configuration and can achieve an extended lifetime and a considerably improved reliability. In addition, since it is not necessary to take into consideration during the cutting process that different materials may be intermixed in a workpiece, the cutting device of the present invention is extremely useful as a smashing or cutting device that is a part of recycling equipment.

Thus, using the cutting device described above makes it possible to automate cutting and disassembling processes of an air conditioner for the purpose of disposal, and eliminates the need for changing the type of cutting tool, processing conditions or cutting devices according to the kind of a workpiece and components. In addition, the present invention contributes to the improvement in reliability, the extension of lifetime of the cutting device, the increase in recycling ratio, the environmental protection, and the efficient use of natural resources.

A first disassembling method of an air conditioner according to the present invention is a method for disassembling an air conditioner including a heat exchanger. The method includes the process of separating the heat exchanger from the air conditioner by cutting both ends of the heat exchanger. The process of separating the heat exchanger uses a cutting device including a rotor with a principal plane, a spindle provided in a normal direction to the principal plane, and at least one impacting body mounted on the spindle rotatably. The impacting body is mounted so that a predetermined fitting gap is provided between the impacting body and the spindle and a part of a periphery of the impacting body can be positioned beyond a periphery of the rotor. The separating process cuts/processes the heat exchanger by rotating the rotor at a high speed to allow the impacting body to impact on at least the heat exchanger at least at a critical impact velocity.

The "critical impact velocity" refers to an intrinsic physical property value of a material of a heat exchanger to be cut and processed and, when the heat exchanger is a composite material of a plurality of materials with different critical impact velocities, means the largest critical impact velocity among them. In accordance with this first disassembling method, even when the heat exchanger has a structure in which different materials are intermixed or each air conditioner has a different structure of the heat exchanger, the air conditioner can be smashed or cut at a high speed with a common cutting device without taking such a structure into consideration. In addition, an impact cutting utilizing a centrifugal force can reduce abrasion of the impacting body serving as a cutting blade, thereby extending a lifetime of the cutting device and improving its reliability.

In the above first disassembling method, it is preferable that the impacting body is allowed to impact on the heat exchanger at a speed of at least about 139 m/second (about 500 km/hour), and it is more preferable that the impacting body is allowed to impact at a speed of at least about 340 m/second (about 1224 km/hour). It also is preferable that the impacting body is allowed to impact on the heat exchanger at a frequency of at least about 150 times/second. This allows a high-speed cutting regardless of a material and a kind of the heat exchanger.

Also, in the above first disassembling method, it is preferable that the impacting body is allowed to impact on the heat exchanger at a speed at least twice as high as the critical impact velocity of the heat exchanger. This allows a high-speed cutting regardless of a material and a kind of the heat exchanger.

Furthermore, in the above first disassembling method, it is preferable that the impacting body cuts the heat exchanger by impacting on the heat exchanger to smash a surface thereof. This allows a high-speed cutting regardless of a material and a kind of the heat exchanger.

Next, a second disassembling method of an air conditioner according to the present invention is a method for disassembling an air conditioner including a heat exchanger. The method includes the process of separating the heat exchanger from the air conditioner by cutting both ends of the heat exchanger. The process of separating the heat exchanger uses a cutting device including at least a first rotating unit and a second rotating unit. Each of these rotating units includes a rotor with a principal plane, a spindle provided in a normal direction to the principal plane, and at least one impacting body mounted on the spindle rotatably. The impacting body is mounted so that a predetermined fitting gap is provided between the impacting body and the spindle and a part of a periphery of the impacting body can be positioned beyond a periphery of the rotor. The separating process allows the impacting body of the first rotating unit and the impacting body of the second rotating unit to impact on the air conditioner sequentially while rotating the rotating units in a plane parallel to the principal plane of the rotor at a high speed and holding the first and second rotating units so that a circular path of a tip of the impacting body of the first rotating unit and a circular path of a tip of the impacting body of the second rotating unit during the rotation substantially are on the same plane, makes a cutting depth by the impacting body of the second rotating unit larger than that by the impacting body of the first rotating unit, and allows the impacting body of at least one of the rotating units to impact on the heat exchanger at least at a critical impact velocity, thereby cutting/processing the heat exchanger in a direction substantially parallel to the principal plane of the rotor.

The "critical impact velocity" refers to an intrinsic physical property value of a material of a heat exchanger to be cut and processed and, when the heat exchanger is a composite material of a plurality of materials with different critical impact velocities, means the largest critical impact velocity among them. In accordance with this second disassembling method, while rotating at least two rotating units, the impacting bodies thereof are allowed to impact on the air conditioner by sequentially increasing the cutting depths by the impacting bodies. At this time, the impacting body of at least one of the rotating units is allowed to impact on the heat exchanger at least at the critical impact velocity of the heat exchanger. Accordingly, even when the heat exchanger has a structure in which different materials are intermixed or each air conditioner has a different structure of the heat exchanger, the heat exchanger can be smashed or cut at a high speed with a common cutting device without taking such a structure into consideration. In addition, an impact cutting utilizing a centrifugal force can reduce abrasion of the impacting body serving as a cutting blade, thereby extending a lifetime of the cutting device and improving its reliability. Moreover, by allowing the impacting body to impact on the air conditioner such that the cutting depths of a plurality of the rotating units increase sequentially, a stable and excellent cutting performance can be achieved even when the air conditioner is thick or a plurality of members with different physical properties are layered in a thickness direction.

In the above second disassembling method, the rotating units can be provided on a common base. This makes it possible to configure a compact cutting device. Also, it becomes easier to control the position of each rotating unit.

Furthermore, in the above second disassembling method, the impacting body can have a different shape in each of the rotating units. For example, an optimal shape of the impacting body is selected according to a rotational speed of the rotating unit, a radius of gyration of the impacting body or a cutting depth thereof, thereby balancing cutting performance, cost and installation safety in an excellent manner.

Moreover, in the above second disassembling method, it is preferable that the impacting body of at least one of the rotating units is allowed to impact on the heat exchanger at a speed of at least about 139 m/second (about 500 km/hour), and it is particularly preferable that the impacting body of at least one of the rotating units is allowed to impact at a speed of at least about 340 m/second (about 1224 km/hour). It also is preferable that the impacting body is allowed to impact on the heat exchanger at a frequency of at least about 150 times/second. This allows a high-speed cutting regardless of a material and a kind of the heat exchanger.

In the above second disassembling method, it is preferable that the impacting body of at least one of the rotating units is allowed to impact on the heat exchanger at a speed at least twice as high as the critical impact velocity of the heat exchanger. This allows a high-speed cutting regardless of a material and a kind of the heat exchanger.

Also, in the above second disassembling method, it is preferable that the impacting body that impacts on the heat exchanger at least at the critical impact velocity cuts the heat exchanger by impacting on the heat exchanger to smash a surface thereof. This allows a high-speed cutting regardless of a material and a kind of the heat exchanger.

In the above first and second disassembling methods, it is preferable that the heat exchanger and a housing of the air conditioner are cut at the same time. Also, in the above second disassembling method, it is preferable that a housing of the air conditioner is cut by the first rotating unit and the heat exchanger is cut by the second rotating unit. This allows an efficient disassembling.

Also, in the above first and second disassembling methods, it is preferable that the cutting device is mounted to an arm of a robot with a multi-axis control function. This allows a three-dimensional processing (processing of a curved surface).

In the above first and second disassembling methods, it is preferable that at least one of an intrinsic oscillatory waveform and an intrinsic oscillation frequency that are caused by an impact of the impacting body against the air conditioner, a load on a driving motor for rotating the rotor and an outer shape of the air conditioner is detected, and at least one of a rotational speed of the rotor, a cutting depth and a relative speed (a feed speed) and a relative moving direction (a feed direction) between the rotor and the air conditioner is changed. This makes it possible to set optimal cutting conditions automatically even when the material and internal structure of the air conditioner are unknown, allowing an automation of the cutting.

Furthermore, in the above second disassembling method, it is preferable that at least one of an intrinsic oscillatory waveform and an intrinsic oscillation frequency that are caused by an impact of the impacting body against the air conditioner and a load on a driving motor for rotating the rotor is detected for each of the rotating units, and at least one of a rotational speed of the rotor, a cutting depth and a relative speed (a feed speed) and a relative moving direction (a feed direction) between the rotor and the air conditioner is changed for each of the rotating units. This makes it possible to set optimal cutting conditions automatically for each of the rotating units, allowing an efficient cutting.

Moreover, in the above-described first or second disassembling method, it is preferable to include further the process of cutting a housing and removing at least a part thereof. The process of cutting the housing uses a cutting device including a rotor with a principal plane, a spindle provided in a normal direction to the principal plane, and at least one impacting body mounted on the spindle rotatably. The impacting body is mounted so that a predetermined fitting gap is provided between the impacting body and the spindle and a part of a periphery of the impacting body can be positioned beyond a periphery of the rotor. The cutting process cuts/processes the housing by rotating the rotor at a high speed to allow the impacting body to impact on at least the housing at least at a critical impact velocity. The "critical impact velocity" refers to an intrinsic physical property value of a material of a housing to be cut and processed and, when the housing is a composite material of a plurality of materials with different critical impact velocities, means the largest critical impact velocity among them. In accordance with this preferable disassembling method, even when the housing has a structure in which different materials are intermixed or each air conditioner has a different structure of the housing, the air conditioner can be smashed or cut at a high speed with a common cutting device without taking such a structure into consideration. In addition, an impact cutting utilizing a centrifugal force can reduce abrasion of the impacting body serving as a cutting blade, thereby extending a lifetime of the cutting device and improving its reliability. Furthermore, it becomes easier to cut the heat exchanger and the housing at the same time.

Moreover, in the above-described first or second disassembling method, it is preferable to further include the process of cutting a housing and removing at least a part thereof. The process of cutting the housing uses a cutting device including at least a first rotating unit and a second rotating unit. Each of these rotating units includes a rotor with a principal plane, a spindle provided in a normal direction to the principal plane, and at least one impacting body mounted on the spindle rotatably. The impacting body is mounted so that a predetermined fitting gap is provided between the impacting body and the spindle and a part of a periphery of the impacting body can be positioned beyond a periphery of the rotor. The cutting process allows the impacting body of the first rotating unit and the impacting body of the second rotating unit to impact on the housing sequentially while rotating the rotating units in a plane parallel to the principal plane of the rotor at a high speed and holding the first and second rotating units so that a circular path of a tip of the impacting body of the first rotating unit and a circular path of a tip of the impacting body of the second rotating unit during the rotation substantially are on the same plane, makes a cutting depth by the impacting body of the second rotating unit larger than that by the impacting body of the first rotating unit, and allows the impacting body of at least one of the rotating units to impact on the housing at least at a critical impact velocity, thereby cutting/processing the housing in a direction substantially parallel to the principal plane of the rotor. The "critical impact velocity" refers to an intrinsic physical property value of a material of a housing to be cut and processed and, when the housing is a composite material of a plurality of materials with different critical impact velocities, means the largest critical impact velocity among them. In accordance with this second disassembling method, while rotating at least two rotating units, the impacting bodies thereof are allowed to impact on the housing by sequentially increasing the cutting depths by the impacting bodies. At this time, the impacting body of at least one of the rotating units is allowed to impact on the housing at least at the critical impact velocity of the housing. Accordingly, even when the housing has a structure in which different materials are intermixed or each air conditioner has a different structure for the housing, the air conditioner can be smashed or cut at a high speed with a common cutting device without taking such a structure into consideration. In addition, an impact cutting utilizing a centrifugal force can reduce abrasion of the impacting body serving as a cutting blade, thereby extending a lifetime of the cutting device and improving its reliability. Moreover, by allowing the impacting body to impact on the housing such that the cutting depths of a plurality of the rotating units increase sequentially, a stable and excellent cutting performance can be achieved even when the housing is thick or a plurality of members with different physical properties are layered in a thickness direction. Furthermore, it becomes easier to cut the heat exchanger and the housing at the same time.

BRIEF DESCRIPTION OF DRAWINGS

FIG. 7A is a front view showing a substantially bow-shaped impacting body, and FIG. 7B is a side view thereof.

FIG. 13A is a front view showing a disc-shaped impacting body, and FIG. 13B is a sectional view thereof taken along the line 13B—13B in FIG. 13A seen in an arrow direction.

FIGS. 17A to 17D are views for showing a cutting order of the outdoor unit according to a first embodiment, with FIG. 17A being a front view, FIG. 17B being a top view, FIG. 17C being a left side view and FIG. 17D being a right side view.

BEST MODE FOR CARRYING OUT THE INVENTION

The following is a specific description of the present invention, with reference to the accompanying drawings.

First, a cutting device used for a disassembling method of the present invention will be described.

[Cutting Device 1]

Figure 1B:
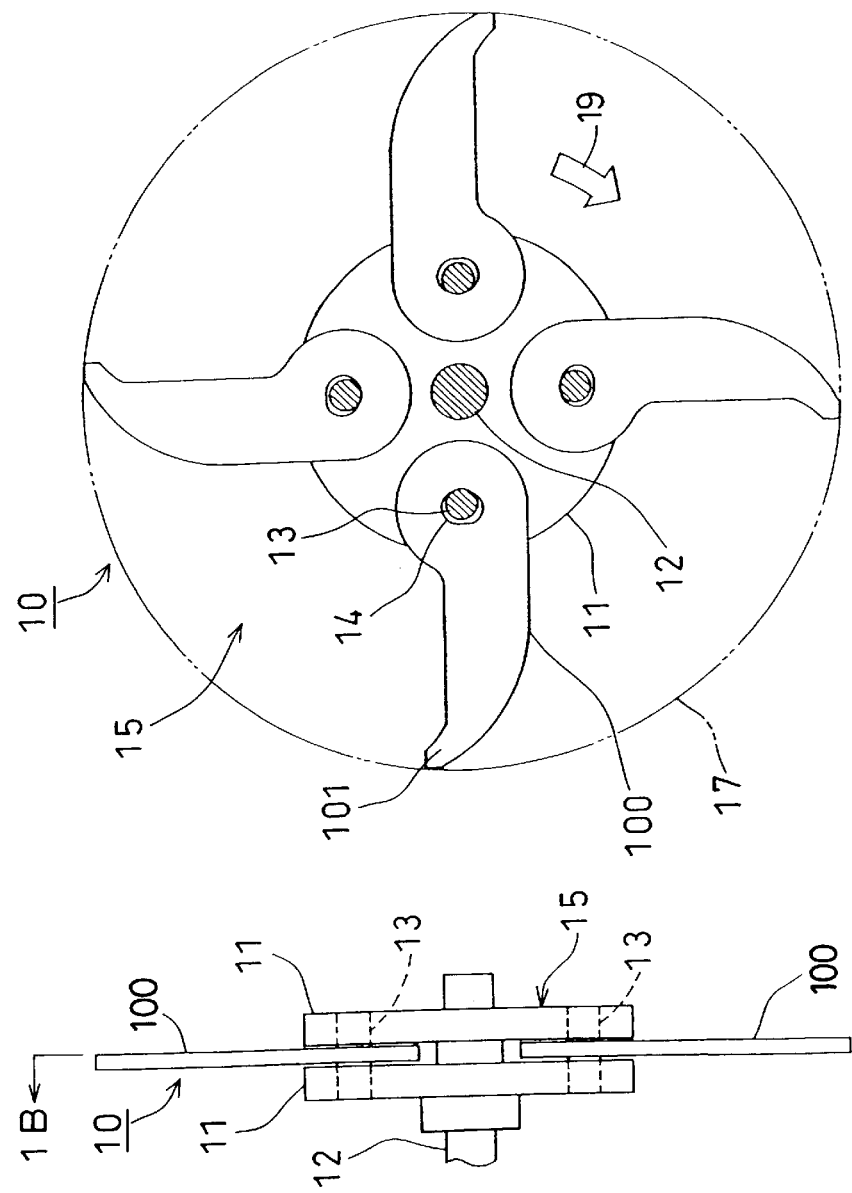
FIG. 1B is a sectional view thereof taken along the line 1B—1B in FIG. 1A seen in an arrow direction.
Figure 1A:
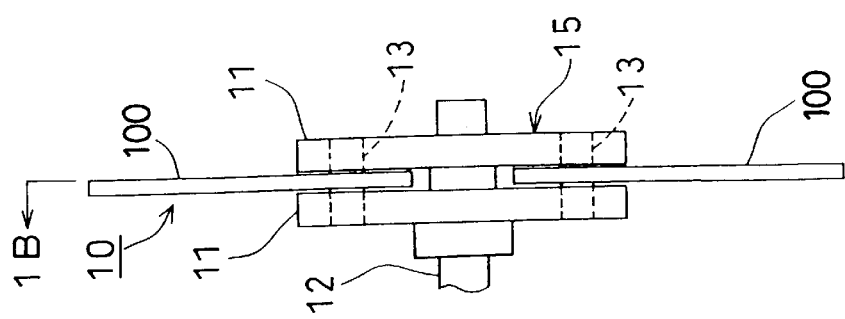
FIG. 1A is a side view showing a first cutting device used for a disassembling method of the present invention.

FIGS. 1A and 1B illustrate a first cutting device of the present invention, with FIG. 1A being a side view and FIG. 1B being a sectional view taken along the line 1B—1B in FIG. 1A seen in an arrow direction.

As shown in FIGS. 1A and 1B, a first cutting device 10 includes a rotating unit 15 having a pair of discs (rotors) 11, 11 that are spaced at a predetermined distance and attached to a main shaft 12 with their principal planes opposing each other, and impacting bodies (hard solid bodies) 100 mounted rotatably to spindles 13 provided between the pair of discs (rotors) 11, 11. The main shaft 12 is connected to a rotating shaft of a driving motor, which is not shown in the figure, and the rotating unit 15 is rotated about the main shaft 12 at a high speed to allow the impacting bodies (hard solid bodies) 100 to impact on a workpiece (an air conditioner) at least at the critical impact velocity of this workpiece. In the case where the workpiece is formed of a plurality of members, the impacting bodies 100 are allowed to impact at least at the largest critical impact velocity among those of these members. With respect to the rotational speed, a variation of about ±10% is allowable due to the variation in power supply voltage or other reasons.

The impact velocity of the impacting bodies 100 against the workpiece naturally corresponds to the rotational speed of the pair of discs (rotors) 11. This cutting device employs a rotational speed in a high rotational speed range of, for example, 10,000 to 60,000 rpm as the rotational speed for the pair of discs (rotors). The high rotational speed range enables the impact force of the impacting bodies 100 to increase and the lifetime thereof to be extended by an air-cooling effect and work hardening.

Figures 2A, 2B:
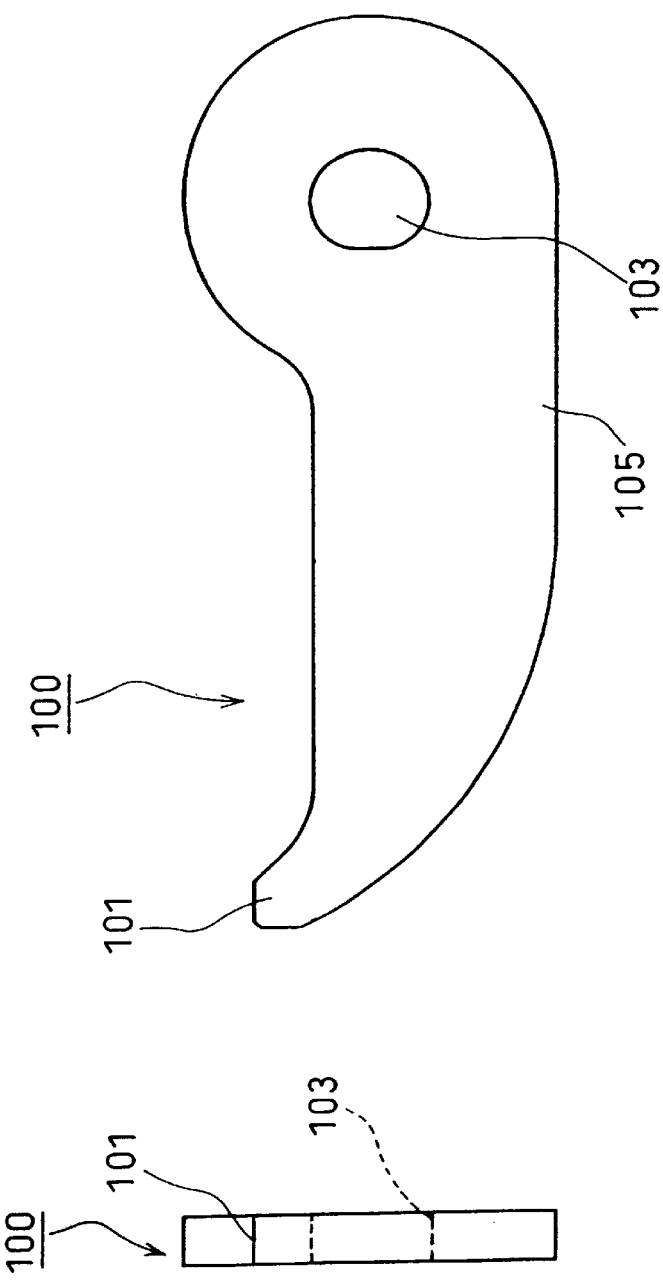
FIG. 2A is a front view showing a substantially bow-shaped impacting body used in the first cutting device.
FIG. 2B is a side view thereof.

In the cutting device 10 shown in FIGS. 1A and 1B, four impacting bodies 100 with a planar shape substantially of a bow are spaced equally between the principal planes of the discs 11. FIGS. 2A and 2B show a specific configuration of the impacting body 100. FIG. 2A is a front view, and FIG. 2B is a side view. As shown in these figures, the substantially bow-shaped impacting body 100 has a floating portion 105, a through hole 103 provided at one end of the floating portion 105 and the cutting blade 101 provided at the other end of the floating portion 105. The floating portion 105 has a shape corresponding to a substantially-bow shape that is formed of a substantially circular-arc portion and a chord extending between both ends of the circular-arc, or a substantially-bow shape that is substantially the same as that of pieces obtained by bisecting an ellipse or an oval along its longitudinal direction. The impacting body 100 is attached to the rotating unit 15 with its cutting blade 101 facing forward in the rotational direction by passing the spindle 13 through the through hole 103. As shown in FIGS. 1A and 1B, the impacting body 100 is attached so that a part of its periphery (in particular, the cutting blade 101) is located beyond the periphery of the disc 11 when the rotating unit 15 rotates. In the device shown in FIGS. 1A and 1B, four impacting bodies 100 are arranged on the principal planes of the discs 11 so as to be spaced equally from each other. The planar shape of the through hole 103 preferably is an ellipse as shown in FIGS. 2A and 2B. More accurately, the planar shape of the through hole 103 is a circular-arc elliptical shape that is formed by two circular arcs with different radii whose centers are the center of gravity of the impacting body 100 and semicircles connecting both ends of these two circular arcs in the circumferential direction. By forming the through hole 103 to be a circular-arc elliptical hole whose center is the center of gravity of the impacting body 100, the displacement of the impacting body 100 when the impacting body 100 rebounds in such a manner as to rotate about its center of gravity after impacting on a workpiece can be absorbed well, thus improving the cutting performance.

Since four impacting bodies 100 are spaced equally between the principal planes of the discs 11, the impacting frequency against the workpiece is at least (10,000 rotations/minute)×four impacting bodies=40,000 times/minute.

A predetermined fitting gap 14 is provided between the spindle 13 and the through hole 103 of the impacting body 100. By providing the fitting gap 14, the impacts on the cutting blades 101 of the impacting bodies 100 and the spindles 13 are relieved even though the rotors 11 rotate at a high speed, thus preventing the spindles or the like in the cutting device 10 from being damaged.

Besides the disc type, the rotors 11 may have an arbitrary shape such as a regular polygon. However, as a matter of course, the rotors should be balanced during rotation.

Since the main shaft 12 rotates at a high speed, a great centrifugal force acts on the impacting bodies 100. The centrifugal force causes a high-speed compressive force along with impacts in a limited portion of the workpiece, including the surface subjected to the impact by the cutting blades 101 of the impacting bodies 100 and the vicinity of the impact surface. Thus, the top layer of the impact surface of the workpiece is smashed at a high speed instantaneously. Cut scraps are in a minute granular state. It has been confirmed by a test that the workpiece can be cut even when no sharp cutting blade is provided.

In the above, the impact velocity of the impacting bodies 100 is not limited to the above-mentioned specific example and can be set freely depending on the kind of a workpiece, cutting conditions, or the like as long as the impact velocity is at least the critical impact velocity of the workpiece. Similarly, the number of impacts by the impacting bodies 100 per unit time also can be changed depending on the kind of a workpiece, cutting conditions, or the like.

When the material of a workpiece is unknown, when a workpiece is formed of a plurality of different kinds of members, or when a member whose material is unknown is hidden in a place that cannot be seen from the outside, such a workpiece can be cut excellently by setting the impact velocity of the impacting bodies to be somewhat higher.

With respect to the material for the impacting bodies 100, members other than metallic members also can be used freely as long as they are hard solid bodies.

Furthermore, the number of the impacting bodies 100 may be only one or at least two. In the case of providing a plurality of the impacting bodies, it is preferable to provide them at equal angles with respect to the rotational center of the rotors, because this results in equal impact intervals to enable stable cutting. In the case of using only one impacting body, a balancer (a weight) is provided to secure the rotational balance.

Instead of spacing the pair of rotors 11 so as to arrange the impacting bodies therebetween, only one rotor may be used, with the spindles provided on one side thereof perpendicularly thereto by a cantilevered support structure, so that the impacting bodies may be provided on these spindles.

The rotor may be driven to rotate at a high speed using a general spindle motor or the like.

The impacting bodies 100 of this cutting device 10 are not provided with sharp cutting blades as in a conventional cutting tool. The cutting principle of this cutting device 10 goes beyond a conventional practical sense and enables even brittle members such as metal, resin, glass, ceramics, or the like to be cut without using sharp cutting blades by providing the impacting bodies 100 with a far higher speed than that in a conventional cutting tool.

[Cutting Device 2]

Figure 3:
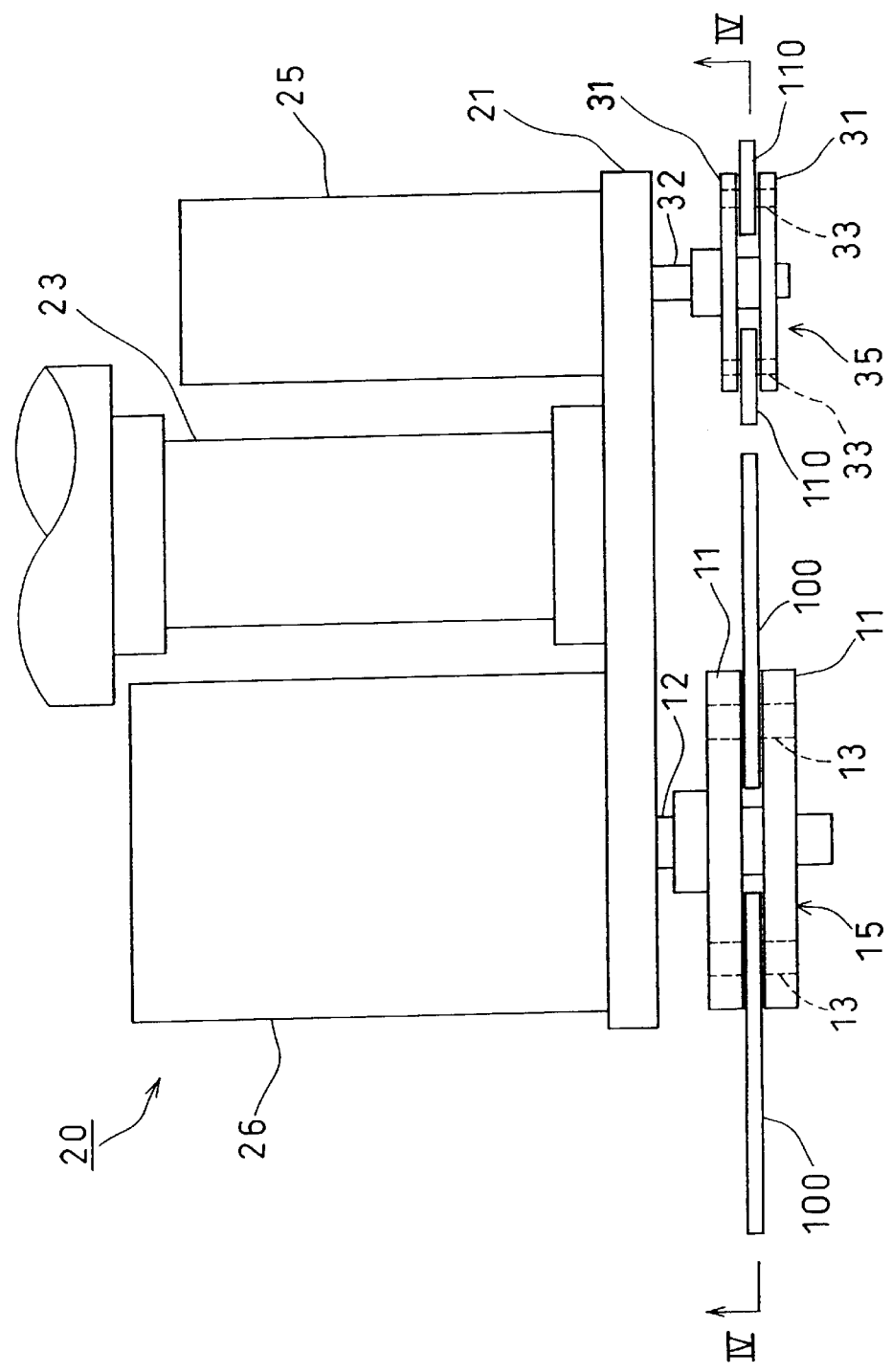
FIG. 3 is a top view showing a second cutting device used for the disassembling method of the present invention.
Figure 4:
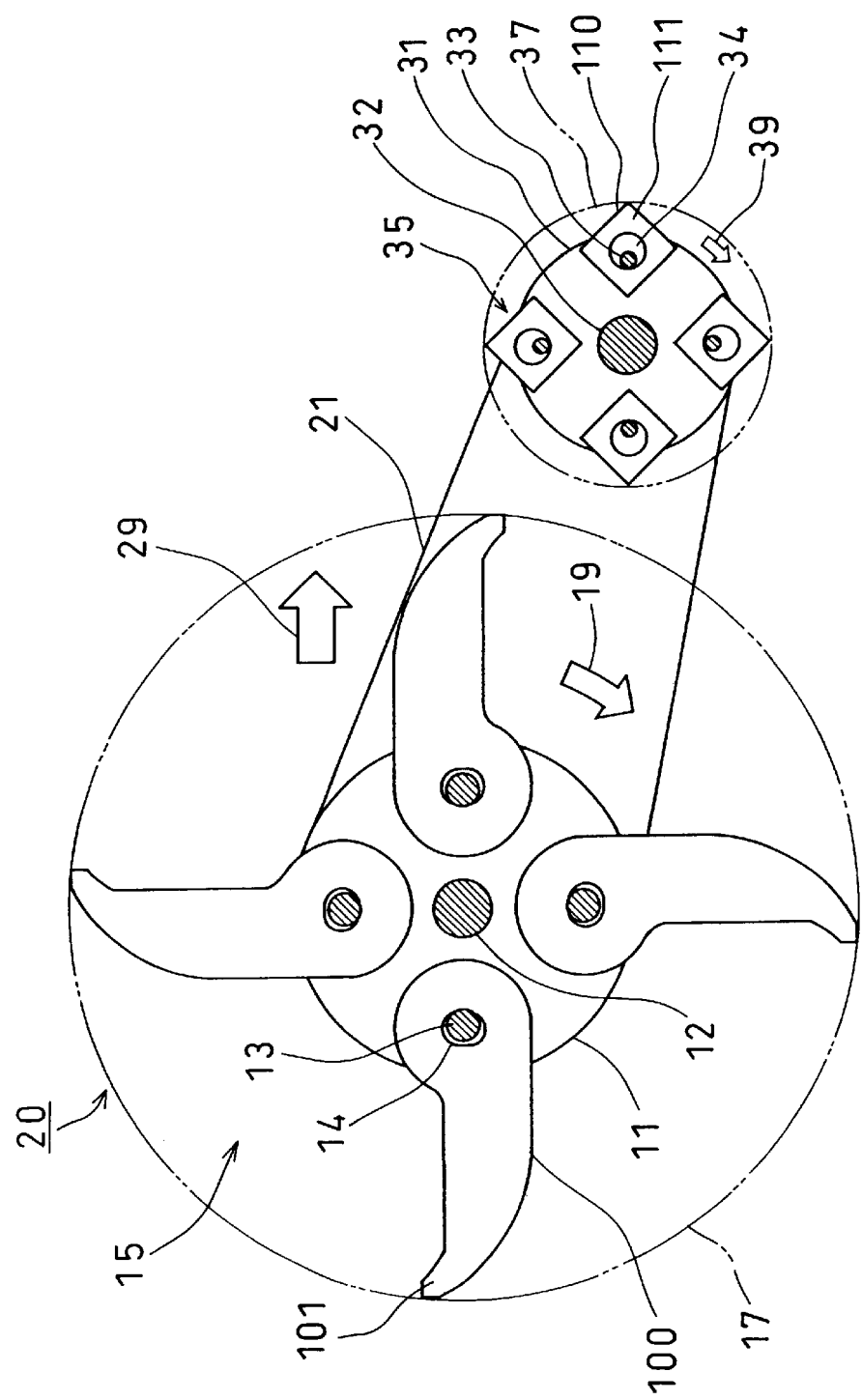
FIG. 4 is a sectional view showing the second cutting device used for the disassembling method of the present invention, which is taken along the line IV—IV in FIG. 3 seen in an arrow direction.

FIG. 3 is a top view showing a second cutting device, and FIG. 4 is a sectional view thereof taken along the line IV—IV in FIG. 3 seen in an arrow direction.

A second cutting device 20 has a first rotating unit 35 and a second rotating unit 15 in this order from the front side of a moving direction (cutting direction) 29 of the cutting device 20 as shown in FIGS. 3 and 4.

The first rotating unit 35 has a pair of discs (rotors) 31, 31 that are spaced at a predetermined distance and attached to a main shaft 32 with their principal planes opposing each other, and impacting bodies (hard solid bodies) 110 mounted rotatably to spindles 33 provided between the pair of discs 31, 31. The main shaft 32 is connected to a rotating shaft of a driving motor 25, so that the first rotating unit 35 is rotated about the main shaft 32 serving as a center of rotation. Four spindles 33 are provided on the circumference of a circle, whose center corresponds to this center of rotation, in such a manner as to be spaced at equal angles.

The second rotating unit 15 has the same configuration as the rotating unit 15 of the first cutting device 10. The same members as the cutting device 10 are given the same numerals, and a specific description thereof will be omitted. The main shaft 12 is connected to a rotating shaft of a driving motor 26, so that the second rotating unit 15 is rotated about the main shaft 12 serving as a center of rotation.

The first rotating unit 35 and the second rotating unit 15 are held by a common base 21 so that the directions of the axes of rotation thereof are parallel and the principal planes of the discs 31 and the discs 11 are on substantially the same plane. In other words, a circular path 37 of cutting blades 111 at the tip of the impacting bodies 110 and a circular path 17 of cutting blades 101 at the tip of the impacting bodies 110 during the rotation substantially are on the same plane. The base 21 is mounted on a robot arm 23.

Figure 5B:
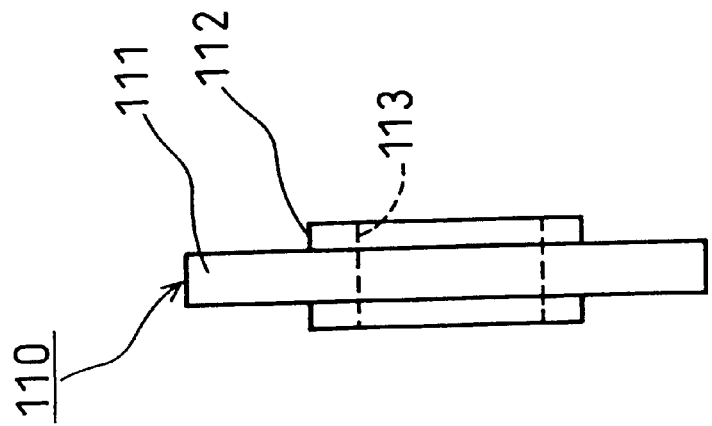
FIG. 5B is a side view thereof.
Figure 5A:
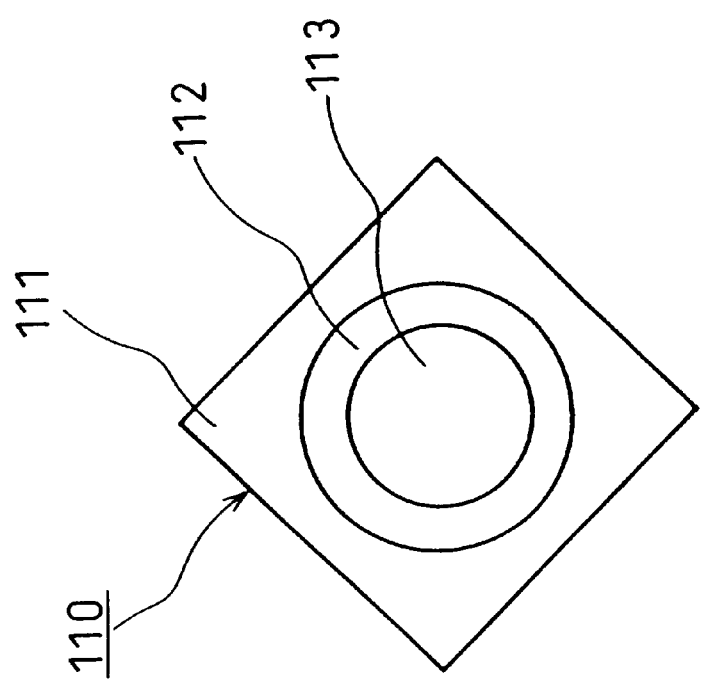
FIG. 5A is a front view showing a square impacting body used in the second cutting device.

FIGS. 5A and 5B show a specific configuration of the impacting body 110. FIG. 5A is a front view, and FIG. 5B is a side view. As shown in these figures, the square impacting body 110 has a shape such as the one obtained by attaching a cylindrical body 112 with a through hole 113 to the central portion of a plate member with a planar shape of a square and a predetermined thickness. The cylindrical body 112 is made to have a length larger than the thickness of the square plate member, thus securing mechanical strength. Four corners 111 of the square plate member correspond to cutting blades in a conventional tool and impact on the workpiece. The impacting body 110 is attached to the rotating unit 35 by passing the spindle 33 through the through hole 113. As shown in FIGS. 3 and 4, the impacting body 110 is attached so that a part of its periphery (in particular, the cutting blade 111) is located beyond the periphery of the disc 31 when the rotating unit 35 rotates. In the device shown in FIGS. 3 and 4, four impacting bodies 110 are arranged on the principal planes of the discs 31 so as to be spaced equally from each other. Since the impacting body 110 is rotationally symmetric with respect to a center of the through hole 113, the center of gravity substantially corresponds to the center of the through hole 113. Therefore, the planar shape of the through hole 113 does not have to be elliptical like that of the through hole 103 of the impacting body 100 shown in FIGS. 2A and 2B, and may be formed to be circular, thereby absorbing the above-mentioned displacement caused by the rebound at the time of impacting.

The structure of the impacting body 100 is the same as that shown in FIGS. 2A and 2B.

A predetermined fitting gap 34 is provided between the spindle 33 and the through hole 113 of the impacting body 110. Similarly, a predetermined fitting gap 14 is provided between the spindle 13 and the through hole 103 of the impacting body 100. By providing the fitting gaps 34, 14, the impacts on the cutting blades 111, 101 and the spindles 33, 13 are relieved when the impacting bodies impact on the workpiece even though the rotors 31, 11 rotate at a high speed, thus preventing components of the rotating units 35, 15 such as the spindles from being damaged.

Besides the disc type, the rotors 31, 11 may have an arbitrary shape such as a regular polygon. However, as a matter of course, the rotors should be balanced during rotation.

With respect to the material for the impacting bodies, members other than metallic members also can be used freely as long as they are hard solid bodies.

Furthermore, the number of the impacting bodies provided in one rotating unit may be only one or at least two. In the case of providing a plurality of the impacting bodies, it is preferable to provide them at equal angles with respect to the rotational center of the rotors, because this results in equal impact intervals to allow stable cutting. In the case of using only one impacting body, a balancer (a weight) is provided to secure the rotational balance.

It is preferable that the cutting blade of the impacting body provided in the following rotating unit is designed to have substantially the same thickness as or to be thinner than that provided in the foregoing rotating unit, which cuts into the workpiece earlier. By cutting into the workpiece with the impacting bodies having the same thickness or with decreasing thickness, the following impacting bodies reliably can fit into a groove-like incised portion formed on the workpiece by the foregoing impacting bodies.

Moreover, instead of spacing the pair of rotors so as to arrange the impacting bodies therebetween, only one rotor may be used, with the spindles provided on one side thereof perpendicularly thereto by a cantilevered support structure, so that the impacting bodies may be provided on these spindles.

The rotor may be driven to rotate at a high speed using a general spindle motor or the like.

The plurality of the rotating units constituting the cutting device do not have to be attached to the common base as in the above example, but may be supported and moved individually so as to move along cutting positions on the workpiece sequentially. However, when they are mounted on the common base, it is possible to control the movement of the cutting device as one piece, allowing a simplification of equipment and const reduction.

As described above, the impacting bodies of this cutting device 20 are not provided with sharp cutting blades as in a conventional cutting tool. The cutting principle of this cutting device 20 goes beyond a conventional practical sense and enables even brittle members such as metal, resin, glass, ceramics, or the like to be cut by a single cutting device without using sharp cutting blades by providing the impacting bodies with a far higher speed than that in a conventional cutting tool.

[Impacting Body]

Impacting bodies to be attached to the cutting devices 10, 20 are not limited to those shown in FIGS. 2A, 2B and FIGS. 5A, 5B, but can be those with various shapes. In the following, examples of usable shapes of impacting bodies will be described.

Figures 6A, 6B:
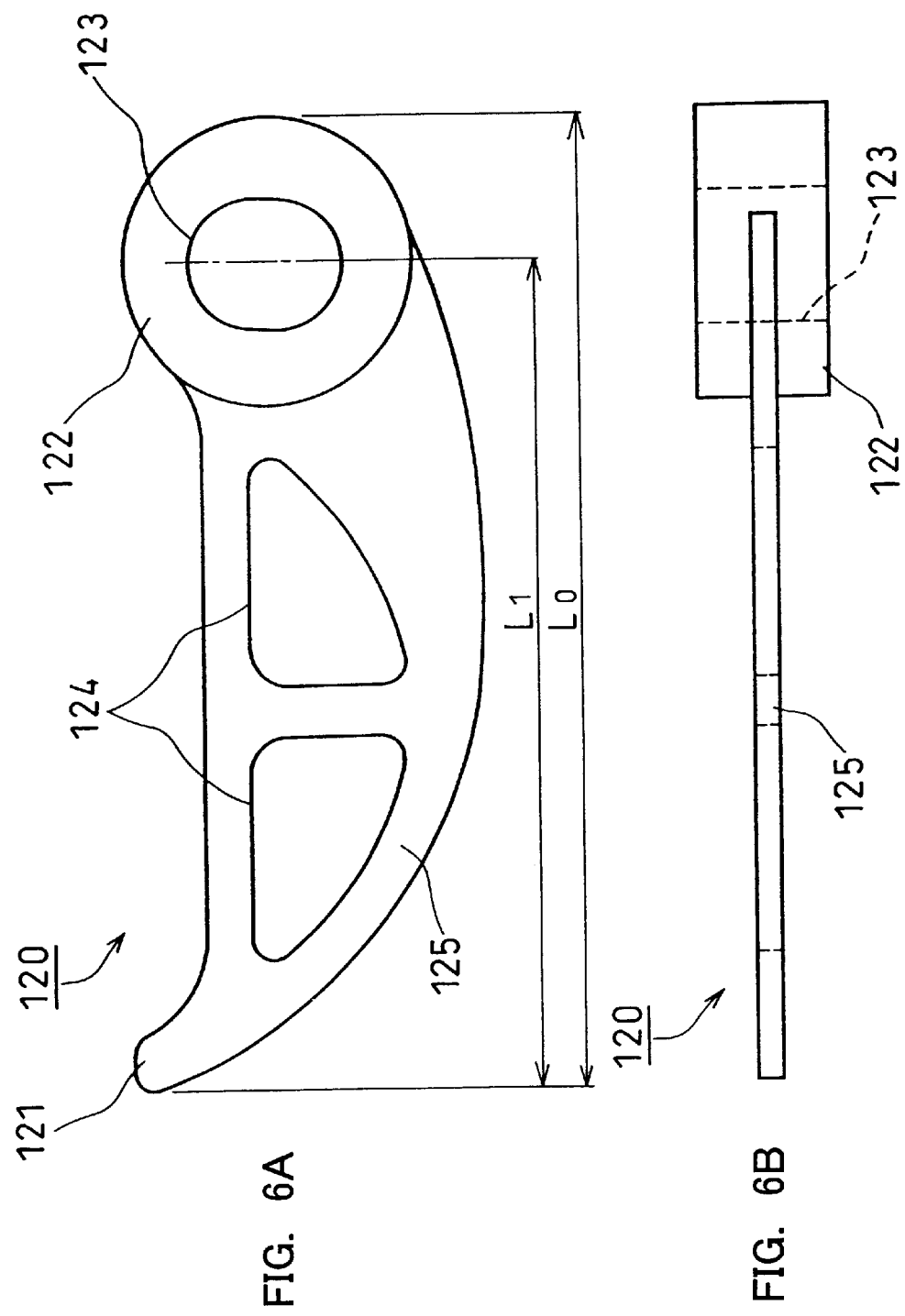
FIG. 6A is a front view showing a substantially bow-shaped impacting body.
FIG. 6B is a side view thereof.

FIGS. 6A and 6B show a substantially bow-shaped impacting body, with FIG. 6A being a front view and FIG. 6B being a side view. A substantially bow-shaped impacting body 120 shown in FIGS. 6A and 6B is an example of modifying the substantially bow-shaped impacting body 100 shown in FIGS. 2A and 2B. As the substantially bow-shaped impacting body 100 shown in FIGS. 2A and 2B, the substantially bow-shaped impacting body 120 has a substantially bow-shaped floating portion 125, a through hole 123 having a circular-arc elliptical shape provided at one end of the floating portion 125 and a cutting blade 121 provided at the other end of the floating portion 125. The substantially bow-shaped impacting body 120 is different from the substantially bow-shaped impacting body 100 shown in FIGS. 2A and 2B in the following points. First, a peripheral region 122 of the through hole 123 through which a spindle is passed is formed to be thick, thus improving a mechanical strength to resist a centrifugal force generated at the time of rotation. Second, the floating portion 125 is provided with through holes 124 so as to reduce weight, thus reducing the centrifugal force generated at the time of rotation.

FIGS. 7A and 7B show another example of a substantially bow-shaped impacting body, with FIG. 7A being a front view and FIG. 7B being a side view. A substantially bow-shaped impacting body 130 shown in FIGS. 7A and 7B is an example of modifying the substantially bow-shaped impacting body 100 shown in FIGS. 2A and 2B. The substantially bow-shaped impacting body 130 has a floating portion 135 as the substantially bow-shaped impacting body 100 shown in FIGS. 2A and 2B, but a portion corresponding to the chord of the bow is bent in the same direction as the substantially circular arc portion in the impacting body 130, whereas it is a straight line in the impacting body 100 shown in FIGS. 2A and 2B. A cutting blade 131 formed at one end of the floating portion 135 is formed to be thicker than the floating portion 135, thus improving an impact strength at the time of impacting against the workpiece. As in the substantially bow-shaped impacting body 100 shown in FIGS. 2A and 2B, a through hole 133 having a circular-arc elliptical shape is formed at the other end of the floating portion 135. In addition, as in the substantially bow-shaped impacting body 120 shown in FIGS. 6A and 6B, a peripheral region 132 of the through hole 133 is formed to be thick, thus improving a mechanical strength to resist a centrifugal force generated at the time of rotation.

Figure 8B:
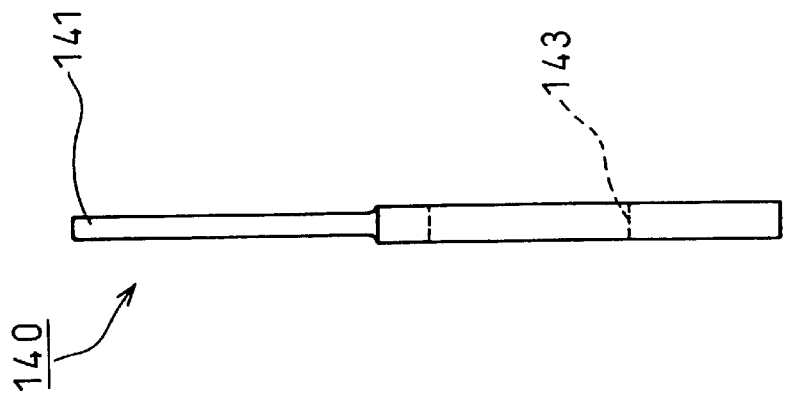
FIG. 8B is a side view thereof.
Figure 8A:
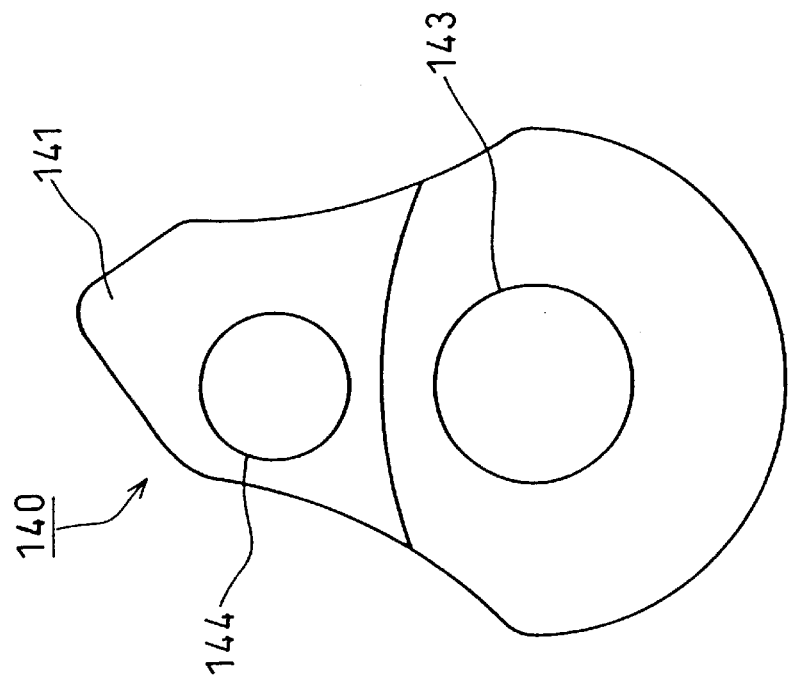
FIG. 8A is a front view showing a substantially bell-shaped impacting body.

FIGS. 8A and 8B show a substantially bell-shaped impacting body, with FIG. 8A being a front view and FIG. 8B being a side view. A substantially bell-shaped impacting body 140 has a planar shape of a bell shape or a suitable variation thereof. An end corresponding to the portion on which the bell is suspended is a cutting blade 141 for impacting on the workpiece, and a wide region on the opposite side is provided with a through hole 143 through which a spindle is passed. Furthermore, a through hole 144 is provided for reducing weight, and the region in which the through hole 144 is formed is thinner than the region in which the through hole 143 is formed.

Figure 9B:
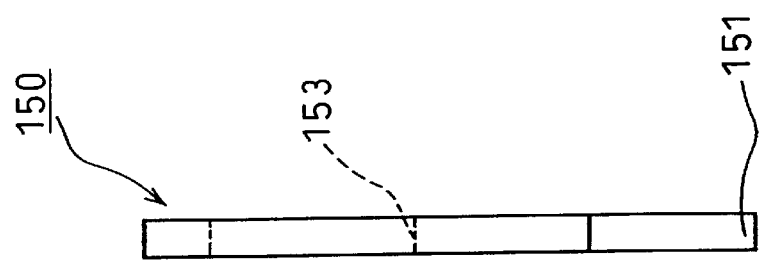
FIG. 9B is a side view thereof.
Figure 9A:
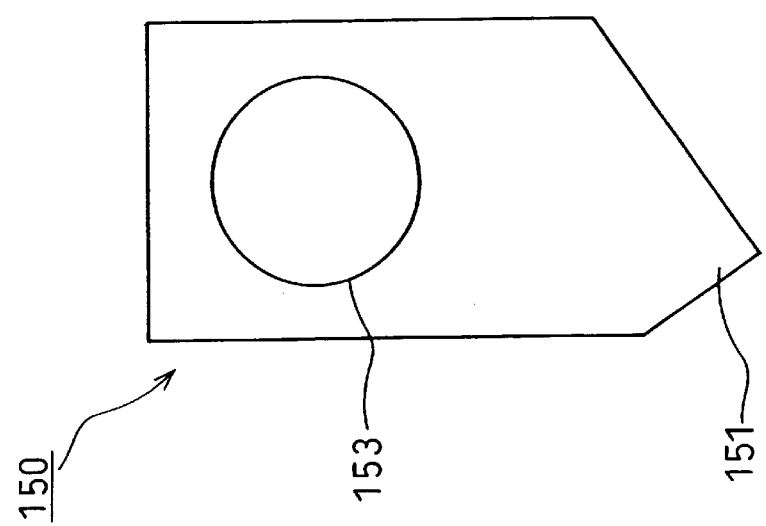
FIG. 9A is a front view showing a modified pentagonal impacting body.

FIGS. 9A and 9B show a modified pentagonal impacting body, with FIG. 9A being a front view and FIG. 9B being a side view. A modified pentagonal impacting body 150 has a planar shape that is substantially the same as a pentagon obtained by cutting off corners on both sides on one shorter side of a rectangle. A resultant corner at the tip formed by cutting off the corners on the both sides is a cutting blade 151 for impacting on the workpiece. On the opposite side, a through hole 153 is formed, through which a spindle is passed.

Figure 10A:
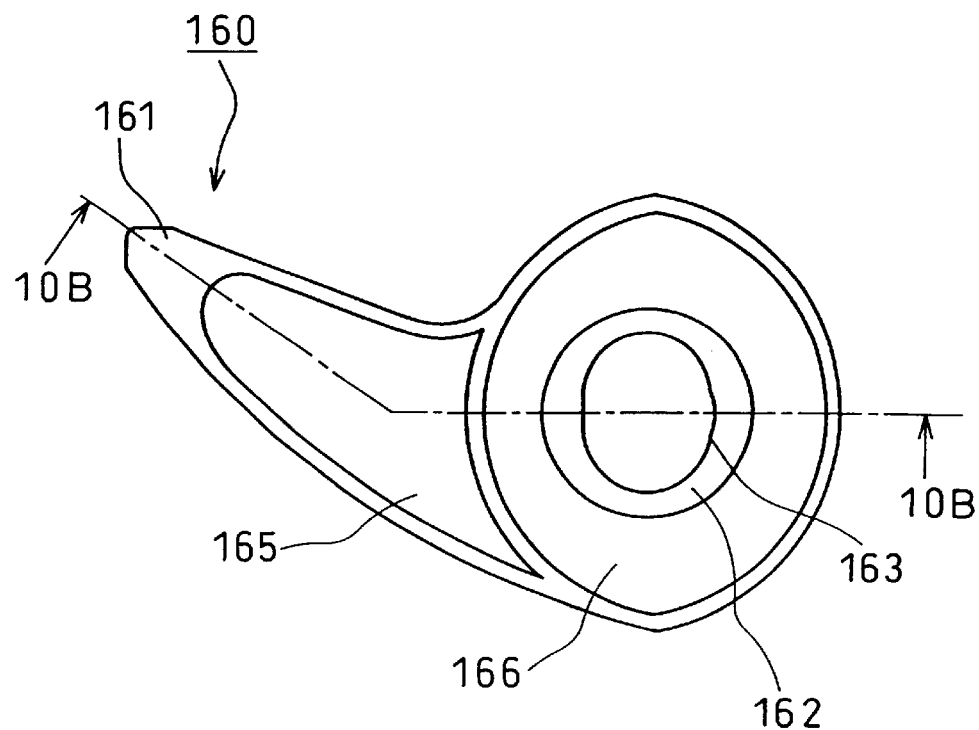
FIG. 10A is a front view showing a substantially "9"-shaped impacting body.
Figure 10B:
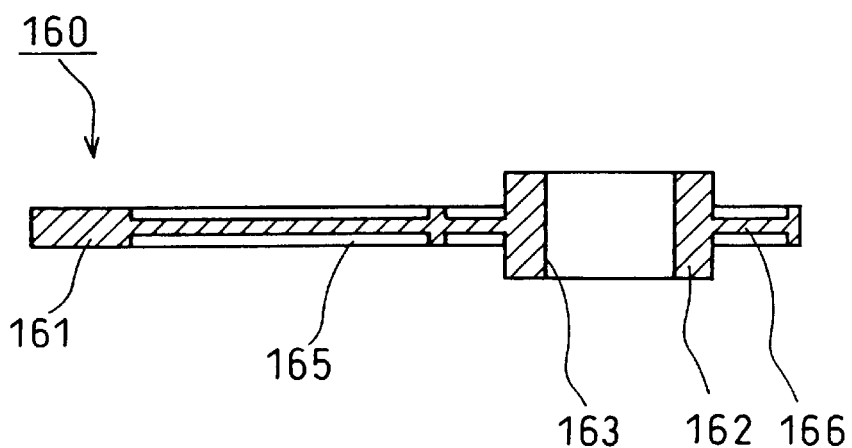
FIG. 10B is a sectional view thereof taken along the line 10B—10B in FIG. 10A seen in an arrow direction.

FIGS. 10A and 10B show a substantially "9"-shaped impacting body, with FIG. 10A being a front view and FIG. 10B being a sectional view taken along the line 10B—10B in FIG. 10A seen in an arrow direction. A substantially "9"-shaped impacting body 160 has a substantially disc-shaped plate 166 having a substantially circular (or substantially oval) shape and a wedge-shaped portion 165, which are connected so as to form a substantially "9" shape or a substantially "," (comma) shape. An end of the wedge-shaped portion 165 is a cutting blade 161 for impacting on the workpiece. In addition, the substantially central portion of the substantially disc-shaped plate 166 is provided with a through hole 163 through which a spindle is passed, and the periphery thereof is formed to be thick for raising the mechanical strength. Furthermore, edge portions of the substantially disc-shaped plate 166 and the wedge-shaped portion 165 are formed to be thick and inner regions thereof are formed to be thin for reducing weight while maintaining the necessary mechanical strength.

Figure 11B:
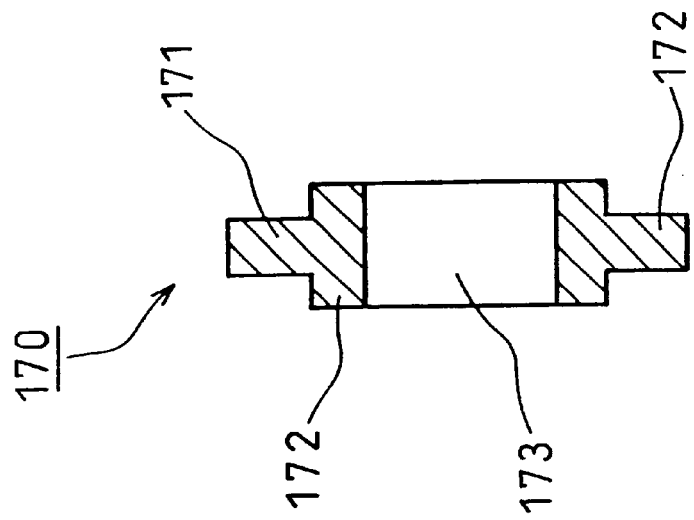
FIG. 11B is a sectional view thereof taken along the line 11B—11B in FIG. 11A seen in an arrow direction.
Figure 11A:
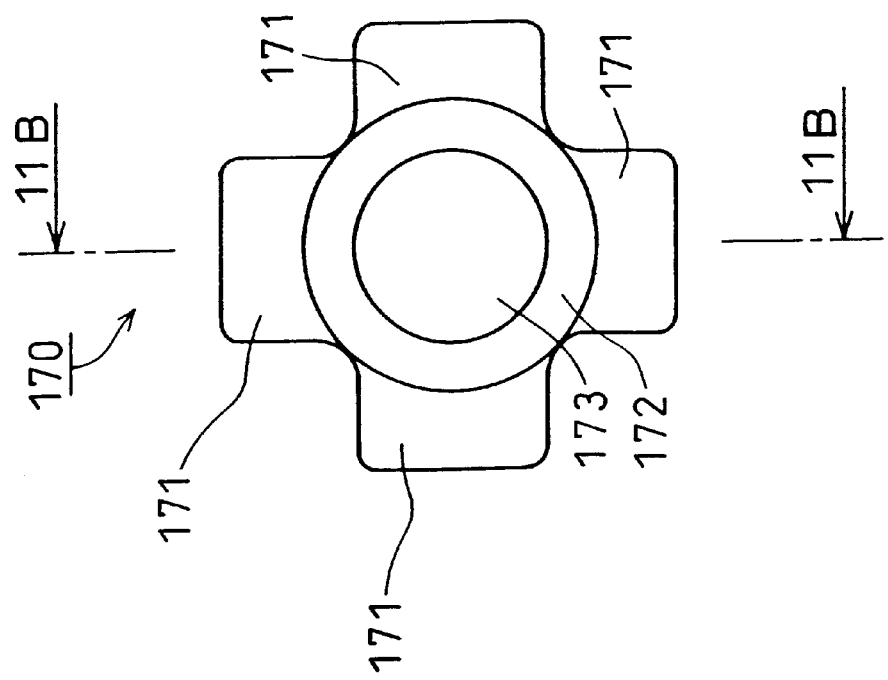
FIG. 11A is a front view showing a substantially cruciform impacting body.

FIGS. 11A and 11B show a substantially cruciform impacting body, with FIG. 11A being a front view and FIG. 11B being a sectional view taken along the line 11B—11B in FIG. 11A seen in an arrow direction. A substantially cruciform impacting body 170 has four rectangular projections 171 spaced at equal angles in such a manner as to be substantially cruciform when seen in the front direction, on the peripheral surface of a cylindrical body 172 having a through hole 173. The rectangular projections 171 correspond to cutting blades in a conventional tool and impact on the workpiece. A part (each rectangular projection, i.e., each cutting blade 171) of the periphery of the impacting body 170 is located beyond the periphery of the discs (the rotors) of the rotating unit. The number of the rectangular projections 171 is not limited to four as in the present example but may be less (two, three) or more (for example, five, six).

Figure 12B:
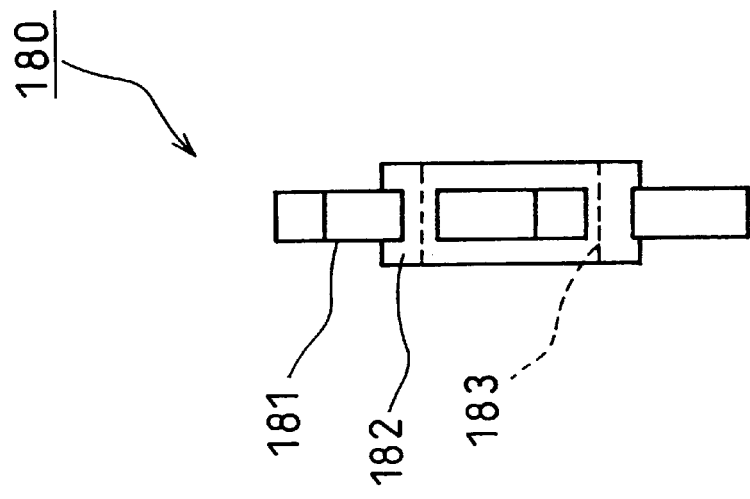
FIG. 12B is a side view thereof.
Figure 12A:
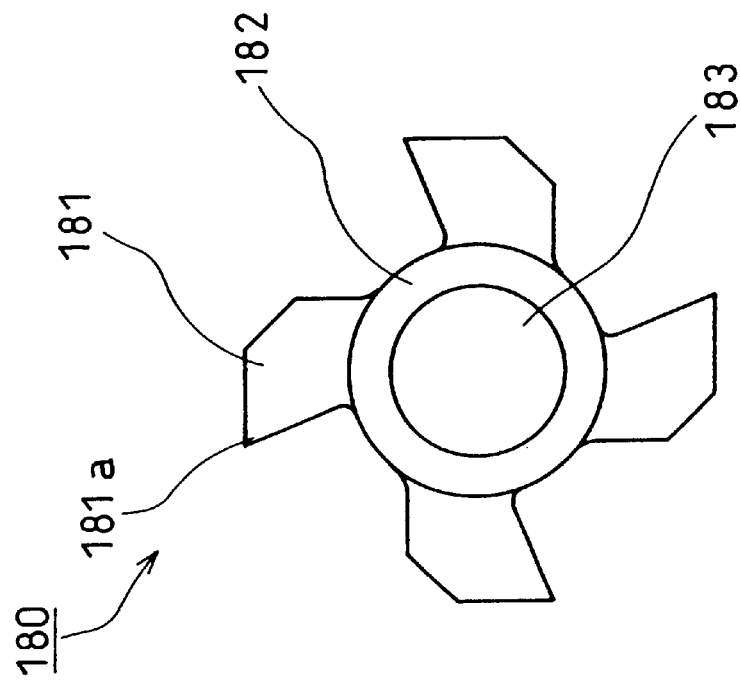
FIG. 12A is a front view showing a modified cruciform impacting body.

FIGS. 12A and 12B show a modified cruciform impacting body as another example of an impacting body having projections at substantially equal angles on its periphery as shown in FIGS. 11A and 11B, with FIG. 12A being a front view and FIG. 12B being a side view. A modified cruciform impacting body 180 is formed by modifying the shape of the rectangular projections 171 in the substantially cruciform impacting body 170 shown in FIGS. 11A and 11B. In other words, the modified cruciform impacting body 180 has four substantially parallelogram projections 181, which are spaced at equal angles in a circumferential direction, on the peripheral surface of a cylindrical body 182 having a through hole 183. The projections 181 are attached so that an acute end 181a on a periphery of each projection 181 faces the direction of impacting on the workpiece. The number of the substantially parallelogram projections 181 is not limited to four as in the present example but may be less (two, three) or more (for example, five, six). Also, instead of the substantially parallelogram projections 181, projections such as substantially triangular projections, arch-shaped projections or substantially semicircular projections also may be provided in such a manner as to be spaced away at equal angles.

FIGS. 13A and 13B show a disc-shaped impacting body 190, with FIG. 13A being a front view and FIG. 13B being a sectional view taken along the line 13B—13B in FIG. 13A seen in an arrow direction. The disc-shaped impacting body 190 has a shape such as the one obtained by inserting a cylindrical body 192 with a through hole 193 into the central portion of a ring cutting blade 191 with a predetermined thickness.

Figures 14A, 14B:
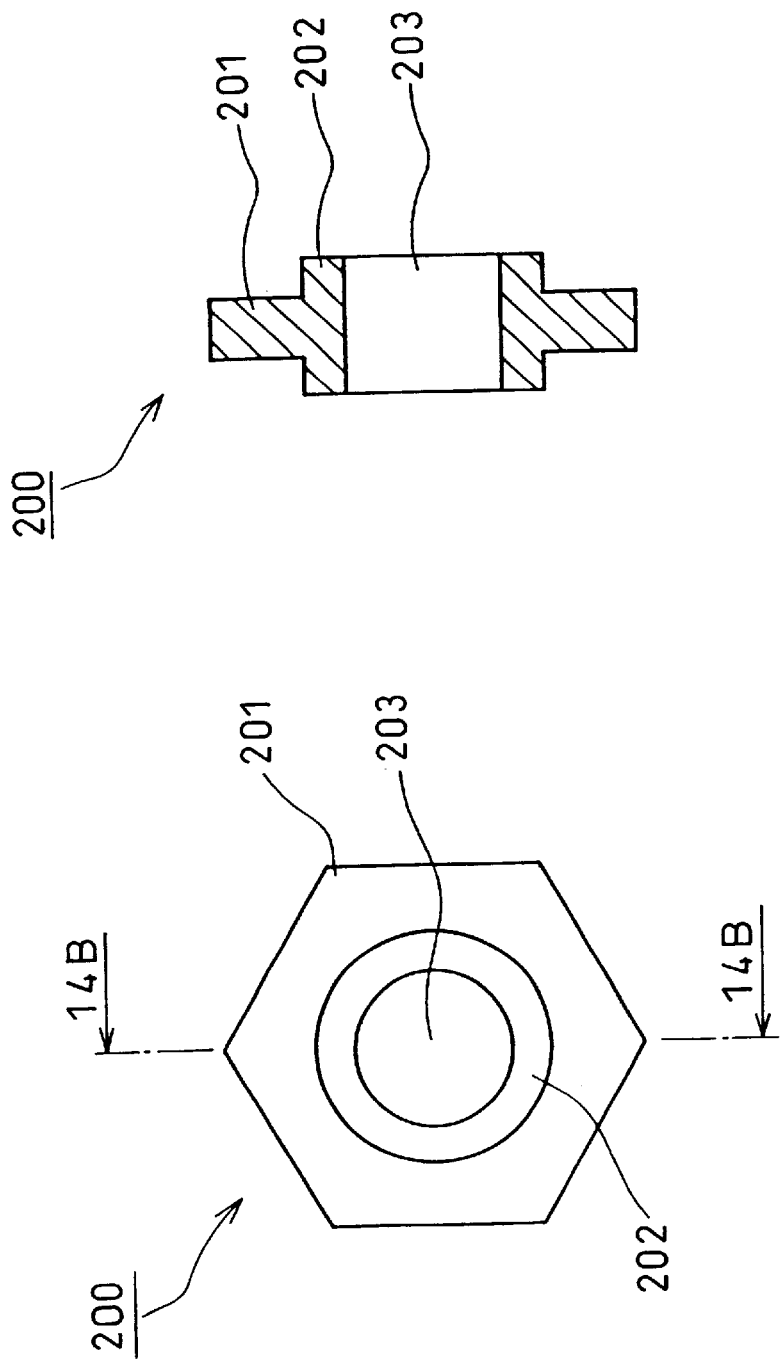
FIG. 14A is a front view showing a regular-hexagonal impacting body.
FIG. 14B is a sectional view thereof taken along the line 14B—14B in FIG. 14A seen in an arrow direction.

FIGS. 14A and 14B show a regular-hexagonal impacting body, with FIG. 14A being a front view and FIG. 14B being a sectional view taken along the line 14B—14B in FIG. 14A seen in an arrow direction. The regular-hexagonal impacting body 200 has a shape such as the one obtained by inserting a cylindrical body 202 with a through hole 203 into the central portion of a plate member with an outer shape of regular hexagon and a predetermined thickness. Six corners 201 on the periphery of the plate member serve as cutting blades. Instead of the regular hexagon, the plate member can have an outer shape of other regular polygons such as a regular triangle, a regular pentagon and a regular octagon.

The impacting body can have various shapes other than the above as long as it has a through hole through which a spindle can be passed and a cutting blade to impact on the workpiece. Furthermore, the tips of the through hole and the cutting blade may be made thick for raising the mechanical strength, while a through hole may be provided suitably or the plate thickness may be reduced partially so as to reduce weight for the purpose of reducing the centrifugal force generated at the time of rotation.

Among the impacting bodies described above, impacting bodies provided with a through hole through which a spindle is inserted at one end of an oblong floating portion, such as the impacting body 100 (FIGS. 2A and 2B), the impacting body 120 (FIGS. 6A and 6B) and the impacting body 130 (FIGS. 7A and 7B) can achieve a larger projecting length beyond the rotor so as to obtain a greater cutting depth, but are relatively heavy and have the center of gravity far from an axis of rotation of the rotating unit. Accordingly, the strength to withstand the centrifugal force generated when rotating the unit at a very high speed has to be considered. Therefore, they can be used suitably as an impacting body of a rotating unit that requires a great cutting depth (the second rotating unit 15 in the second cutting device 20) or a rotating unit rotating at a relatively low speed. On the other hand, impacting bodies that are rotationally symmetric with respect to an axis of the through hole through which a spindle is inserted, such as the impacting body 110 (FIGS. 5A and 5B), the impacting body 170 (FIGS. 11A and 11B), the impacting body 180 (FIGS. 12A and 12B), the impacting body 190 (FIGS. 13A and 13B) and the impacting body 200 (FIGS. 14A and 14B) have a smaller projecting length beyond the rotor but can achieve lighter weight. Therefore, they can be used suitably as an impacting body of a rotating unit that does not require a great cutting depth (the first rotating unit 35 in the second cutting device 20) or a rotating unit requiring a relatively high speed rotation. Furthermore, the shapes of the impacting body 140 (FIGS. 8A and 8B), the impacting body 150 (FIGS. 9A and 9B) and the impacting body 160 (FIGS. 10A and 10B) have intermediate characteristics between the above two groups and can be used for both the first rotating unit 35 and the second rotating unit 15 in the second cutting device 20.

(First Embodiment)

The following is a description of an exemplary method for disassembling an outdoor unit of an air conditioner according to the present invention, with reference to accompanying drawings.

Figure 15:
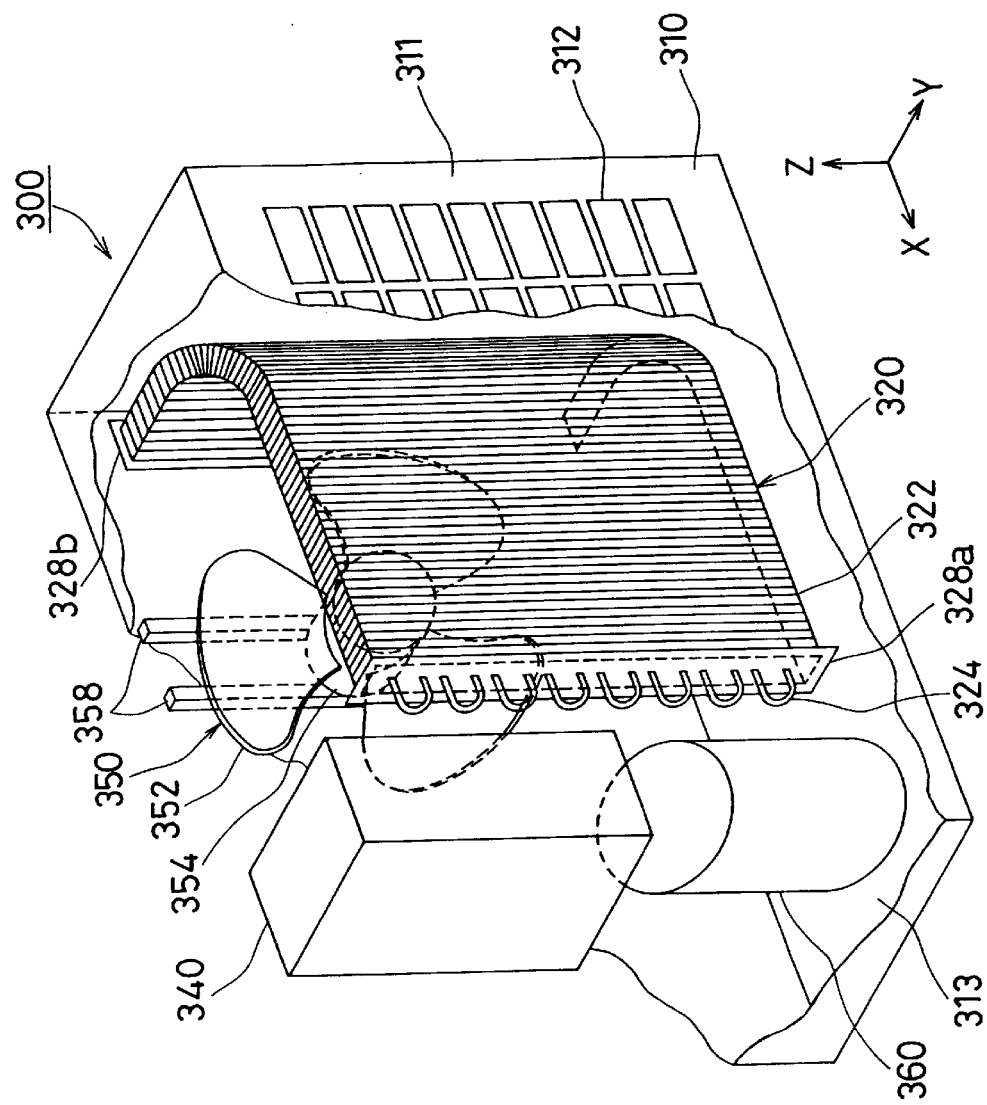
FIG. 15 is a partially broken perspective view showing a schematic configuration of an outdoor air conditioner unit.
Figure 16B:
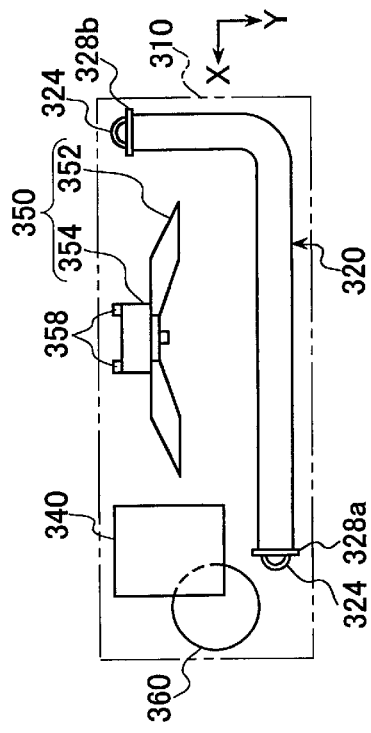
FIGS. 16A to 16C are views showing a schematic configuration of the outdoor air conditioner unit, with FIG. 16A being a front view, FIG. 16B being a top view and FIG. 16C being a left side view.
Figure 16A:
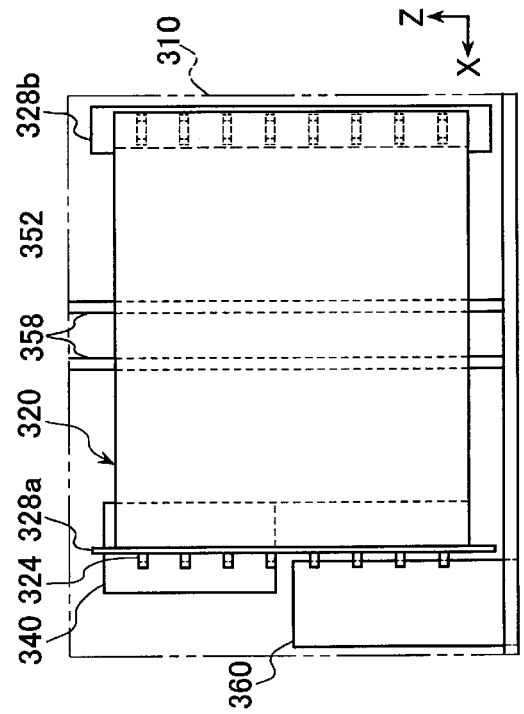
Figure 16C:
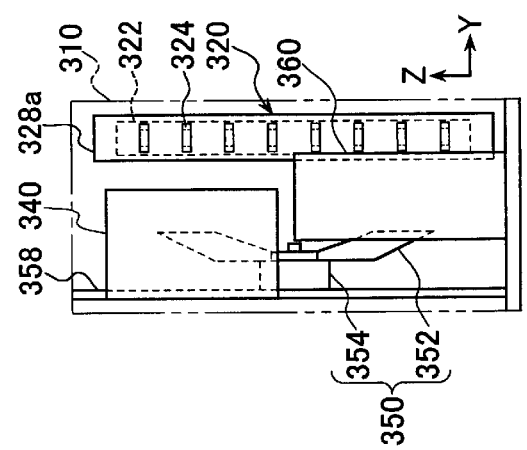

FIG. 15 is a perspective view showing a schematic configuration of the outdoor air conditioner unit, in which a part of a housing is cut away so as to illustrate its internal structure clearly. FIGS. 16A to 16C also show a schematic configuration of the outdoor unit of the air conditioner, with FIG. 16A being a front view, FIG. 16B being a top view and FIG. 16C being a left side view. In FIGS. 16A to 16C, for the purpose of illustrating its internal structure clearly, the housing is indicated by a chain double-dashed line and main elements therein are indicated by solid lines. For convenience of description in the following, an X-Y-Z rectangular coordinate system is defined as shown in FIG. 15, FIGS. 16A to 16C. When the outdoor unit is seen from the front side, an X-axis corresponds to the horizontal direction, a Y-axis corresponds to the depth direction and a Z-axis corresponds to the vertical direction, with a direction in which each arrow faces indicating a forward direction.

As shown in FIG. 15, FIGS. 16A to 16C, an outdoor unit 300 has a housing 310 containing a heat exchanger 320, a controller 340, a blower 350 and a compressor 360.

The housing 310 is formed by joining metal plates into a substantially rectangular parallelepiped shape, and a front plate 311 thereof is provided with many openings 312 through which air from the blower 350 can pass.

The heat exchanger 320 has many substantially rectangular metal sheets 322 that are made of a material such as aluminum and arranged at a predetermined spacing from one another and metal pipes 324 that are made of a material such as copper and penetrate these metal sheets. The metal sheets 322 efficiently exchange heat between a refrigerant gas running through the metal pipes 324 and external air. This heat exchanger 320 is supported by support plates 328a, 328b at both ends and fixed to the housing 310 (for example, a bottom plate 313 of the housing 310). Incidentally, although the heat exchanger 320 has a planar shape that is bent into a substantially L shape in FIG. 15, FIGS. 16A to 16C, there are some cases where a heat exchanger that is not bent like this but has a flat shape is used.

The controller 340 controls an operation of the blower 350 and the compressor 360 and is constituted mainly by a printed circuit board and various kinds of electronic components mounted thereon. The controller 340 is held within the housing 310 by using a jig, which is not shown in the drawing.

The blower 350 includes a fan 352 arranged so as to face the heat exchanger 320 and a motor 354 for rotating the fan 352. The blower 350 is held within the housing 310 by support posts 358.

The compressor 360 is fixed to the bottom plate 313 of the housing 310 by a predetermined jig.

A method for disassembling a discarded outdoor unit 300 having a structure as above will be described in the following.

First, a refrigerant gas (for example, chlorofluorocarbons) remaining in the heat exchanger 320 and the compressor 360 is collected by a known method. Then, the outdoor unit 300 is cut by using the cutting device described above.

FIGS. 17A to 17D show an example of a cutting order. FIG. 17A is a front view, FIG. 17B is a top view, FIG. 17C is a left side view and FIG. 17D is a right side view.

First, the housing 310 is cut horizontally (in an X-axis direction) along a cutting line 371 near a top plate of the housing 310. Subsequently, the housing 310 is cut horizontally along a cutting line 372 near the bottom plate 313 of the housing 310.

Figure 18:
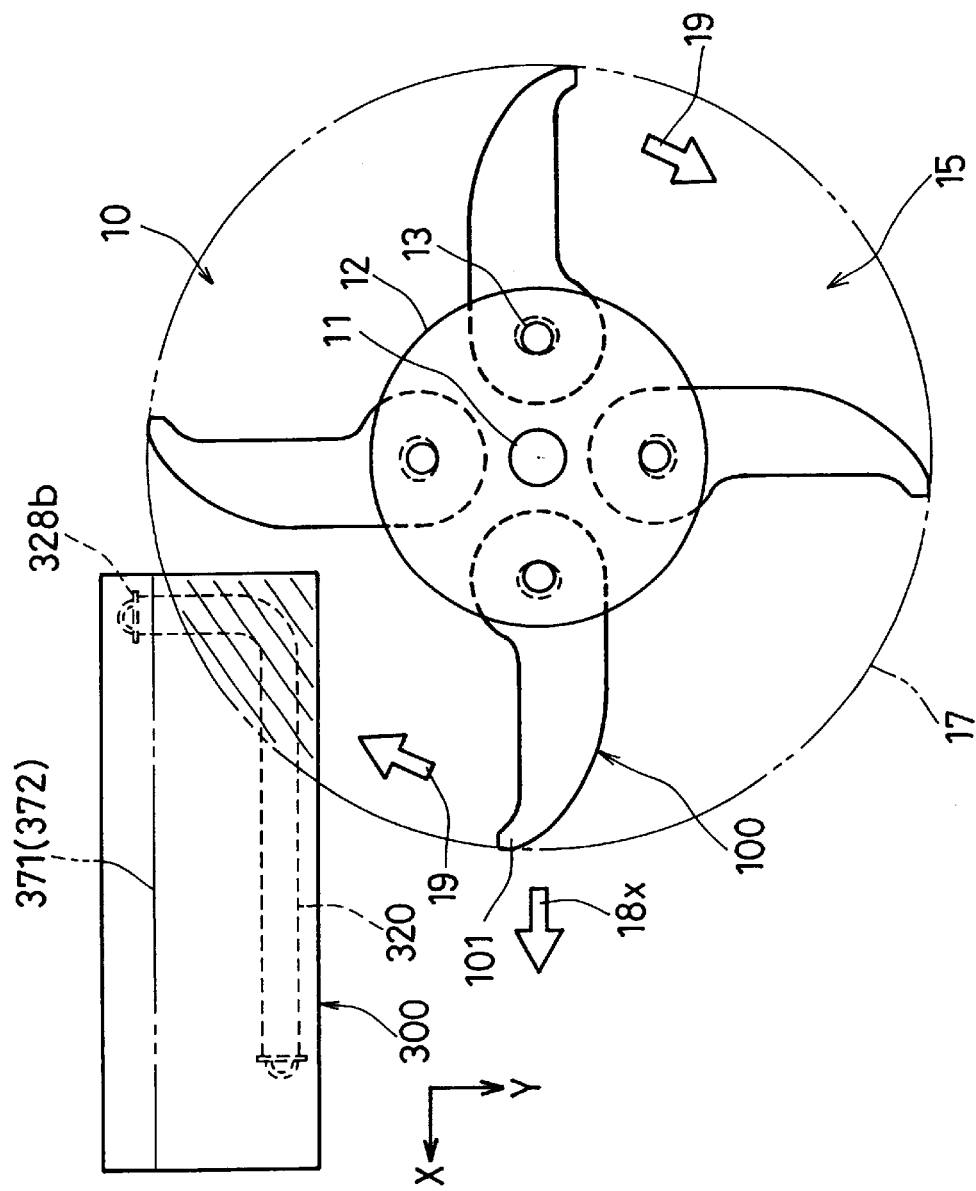
FIG. 18 is a top view showing how a front plate of the outdoor unit is cut horizontally using the first cutting device.

FIG. 18 is a top view showing how the outdoor unit 300 is cut along the cutting line 371 (or 372) using the first cutting device 10. The cutting device 10 is moved in a direction indicated by an arrow 18x (a forward direction of the X-axis) at a predetermined speed while the rotating unit 15 is rotated in a direction indicated by arrows 19 such that a tip 101 of the impacting body 100 of the cutting device 10 rotates within an X-Y plane (a plane parallel with a plane including the X-axis and the Y-axis; hereinafter, referred to in the same manner).

At this time, it is preferable that the cutting line 371 is positioned between the heat exchanger 320 and the top plate with respect to the Z-axis direction and that the cutting line 372 is positioned between the heat exchanger 320 and the bottom plate 313 with respect to the Z-axis direction. It also is preferable that a cutting depth of the cutting lines 371, 372 with respect to the Y-axis direction approximately extends to the position of the support plate 328b with respect to the Y-axis direction. Although it is difficult to judge the location of the heat exchanger 320 accurately from outside of the housing 310, an approximate location of the heat exchanger 320 can be estimated from the positions of the openings 312 provided in the front plate 311.

Thereafter, as shown in FIGS. 17A to 17D, the front plate 311 provided with the openings 312 is cut vertically (in the Z-axis direction) along a cutting line 373.

Figure 19:
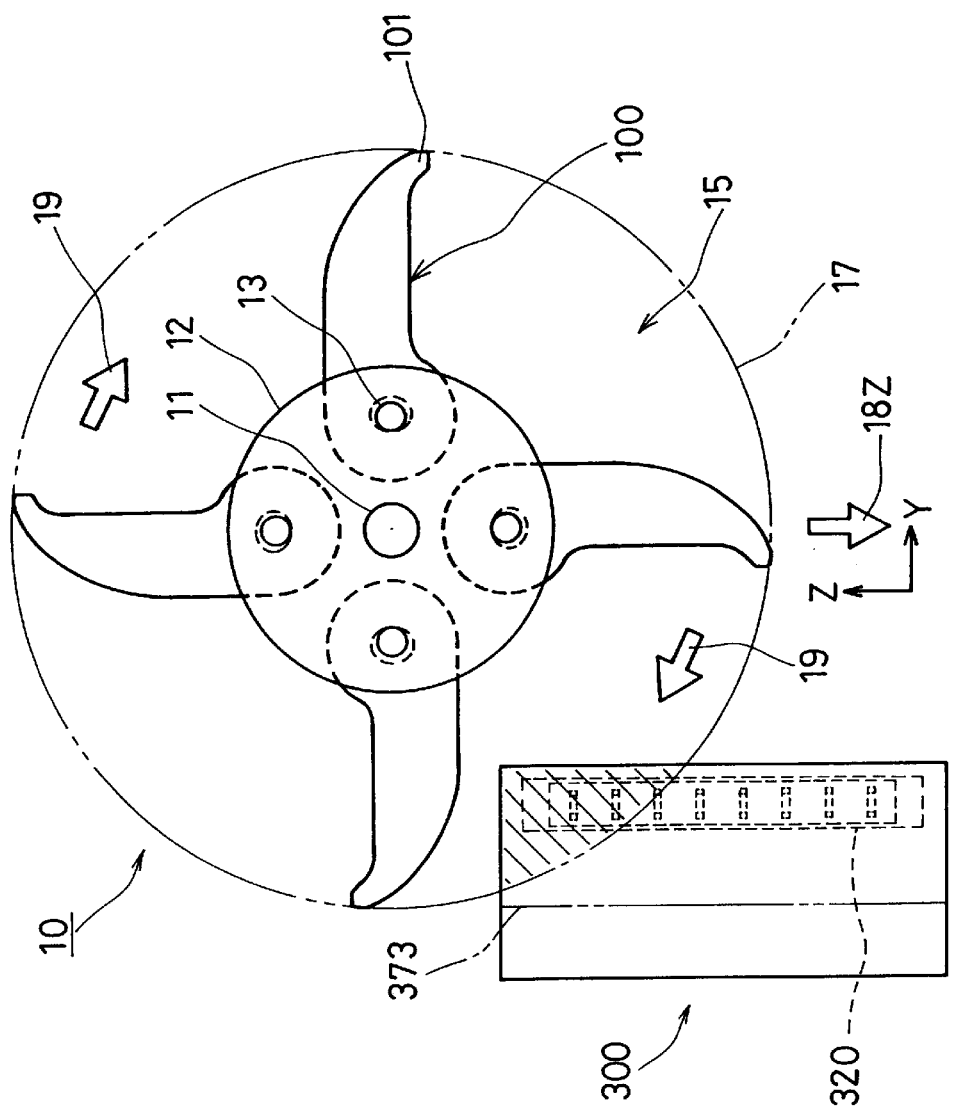
FIG. 19 is a left side view showing how the front plate of the outdoor unit is cut vertically using the first cutting device.

FIG. 19 is a left side view showing how the outdoor unit 300 is cut along the cutting line 373 using the first cutting device 10. The cutting device 10 is moved in a direction indicated by an arrow 18*z* (a backward direction of the Z-axis) at a predetermined speed while the rotating unit 15 is rotated in the arrow 19 direction such that the tip 101 of the impacting body 100 of the cutting device 10 rotates within a Y-Z plane.

At this time, it is preferable that the cutting line 373 is positioned close to and on an inner side (on a backward side of the X-axis) of the support plate 328*a* of the heat exchanger 320 with respect to the X-axis direction. Although it is difficult to judge the location of the heat exchanger 320 accurately from outside of the housing 310, an approximate location of the heat exchanger 320 can be estimated from the positions of the openings 312 provided in the front plate 311. In addition, it is preferable that the cutting depth with respect to the Y-axis direction approximately extends to the position allowing at least the heat exchanger 320 to be cut completely.

Thereafter, as shown in FIGS. 17A to 17D, a right side plate is cut vertically (in the Z-axis direction) along a cutting line 374.

Figure 20:
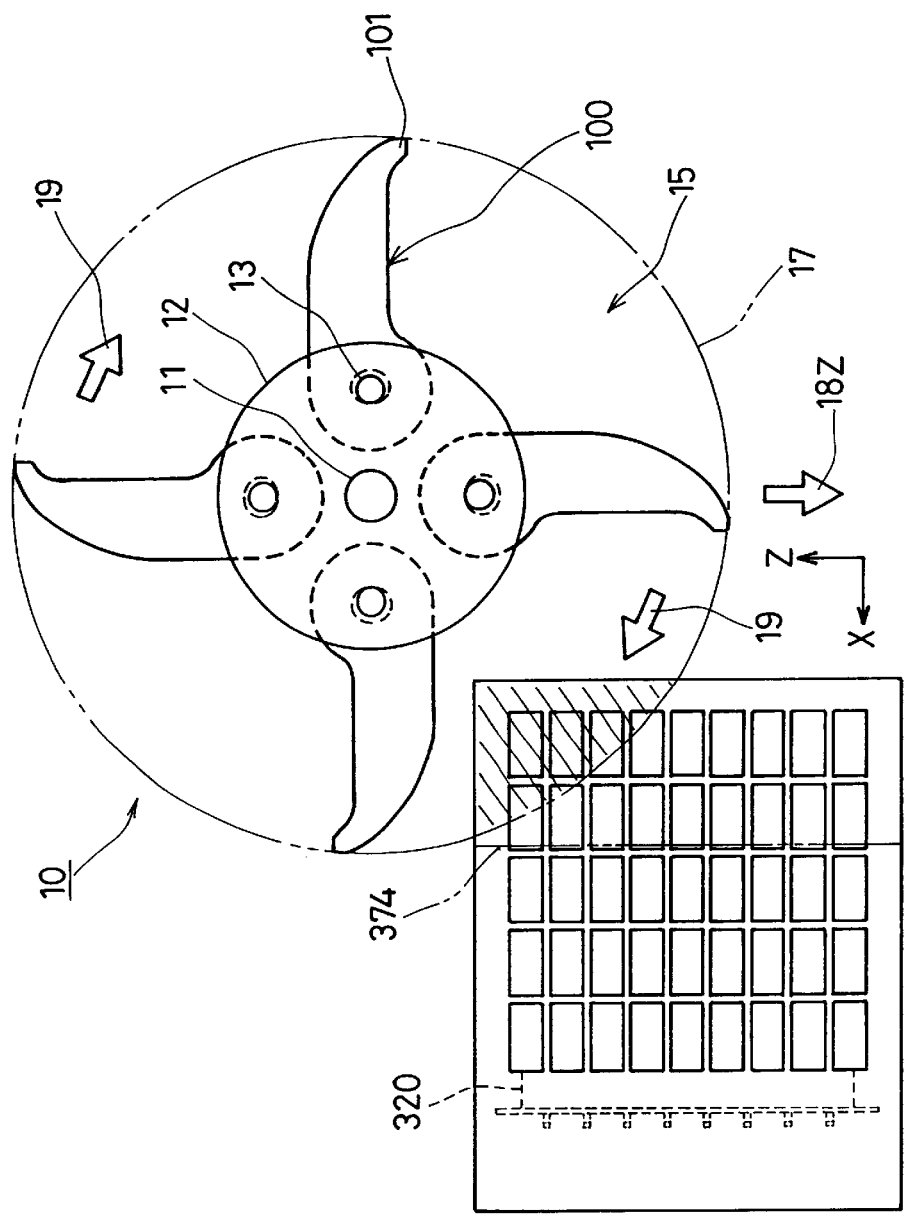
FIG. 20 is a front view showing how a right side plate of the outdoor unit is cut vertically using the first cutting device.

FIG. 20 is a front view showing how the outdoor unit 300 is cut along the cutting line 374 using the first cutting device 10. The cutting device 10 is moved in the arrow 18*z* direction (a backward direction of the Z-axis) at a predetermined speed while the rotating unit 15 is rotated in the arrow 19 direction such that the tip 101 of the impacting body 100 of the cutting device 10 rotates within an X-Z plane.

At this time, it is preferable that the cutting line 374 is positioned close to and on an inner side (on a forward side of the Y-axis) of the support plate 328*b* of the heat exchanger 320 with respect to the Y-axis direction. An approximate location of the support plate 328*b* can be checked by peeking from the position of the cutting lines 371, 372 and 373 that are already cut. In addition, it is preferable that the cutting depth with respect to the X-axis direction approximately extends to the position allowing at least the heat exchanger 320 to be cut completely.

Figure 21:
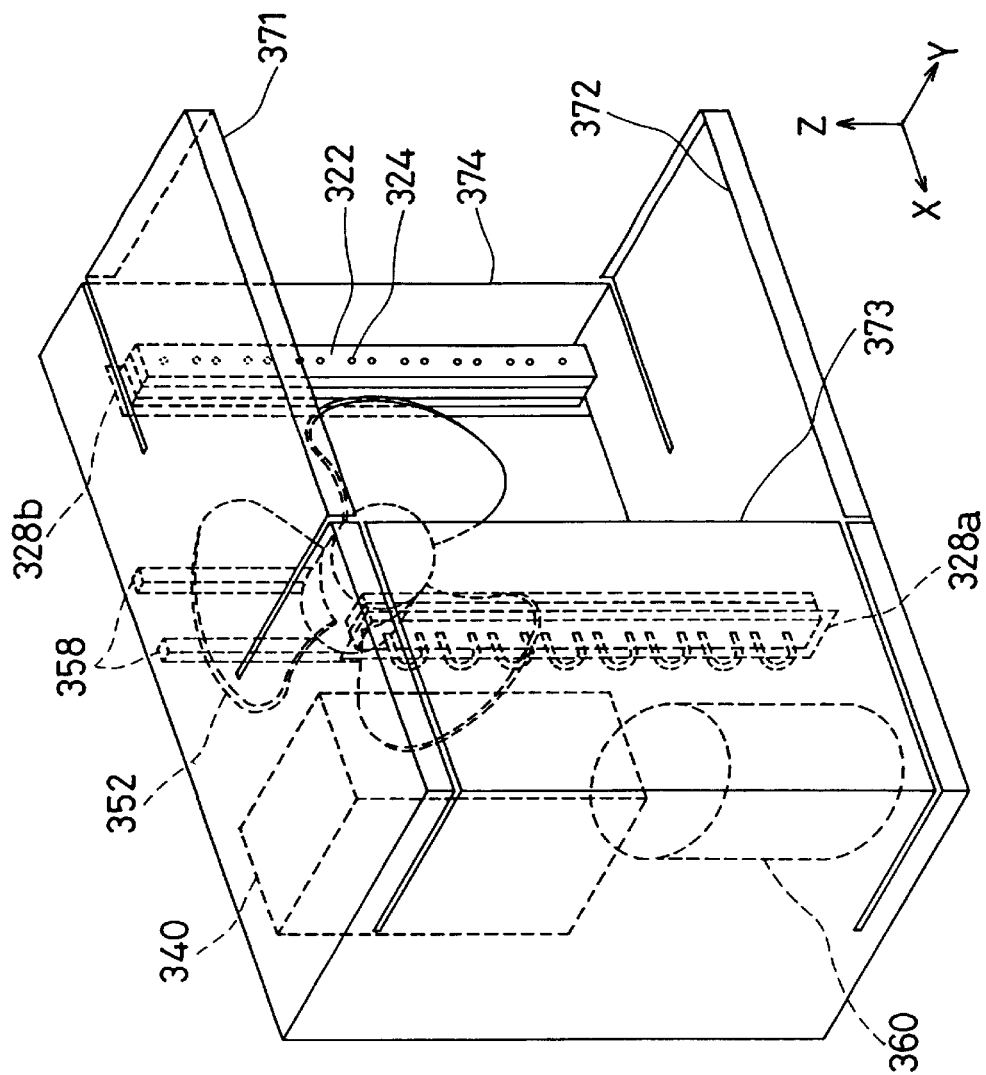
FIG. 21 is a perspective view showing how a part of a housing and a heat exchanger of the outdoor unit are cut and separated.

When the cutting along the cutting line 374 is finished, a part of the housing 310 with an L-shaped cross-section is cut out at the same time, and the heat exchanger 320 inside also is cut away so as to leave the support plates 328*a*, 328*b*, as shown in FIG. 21.

Figure 22:
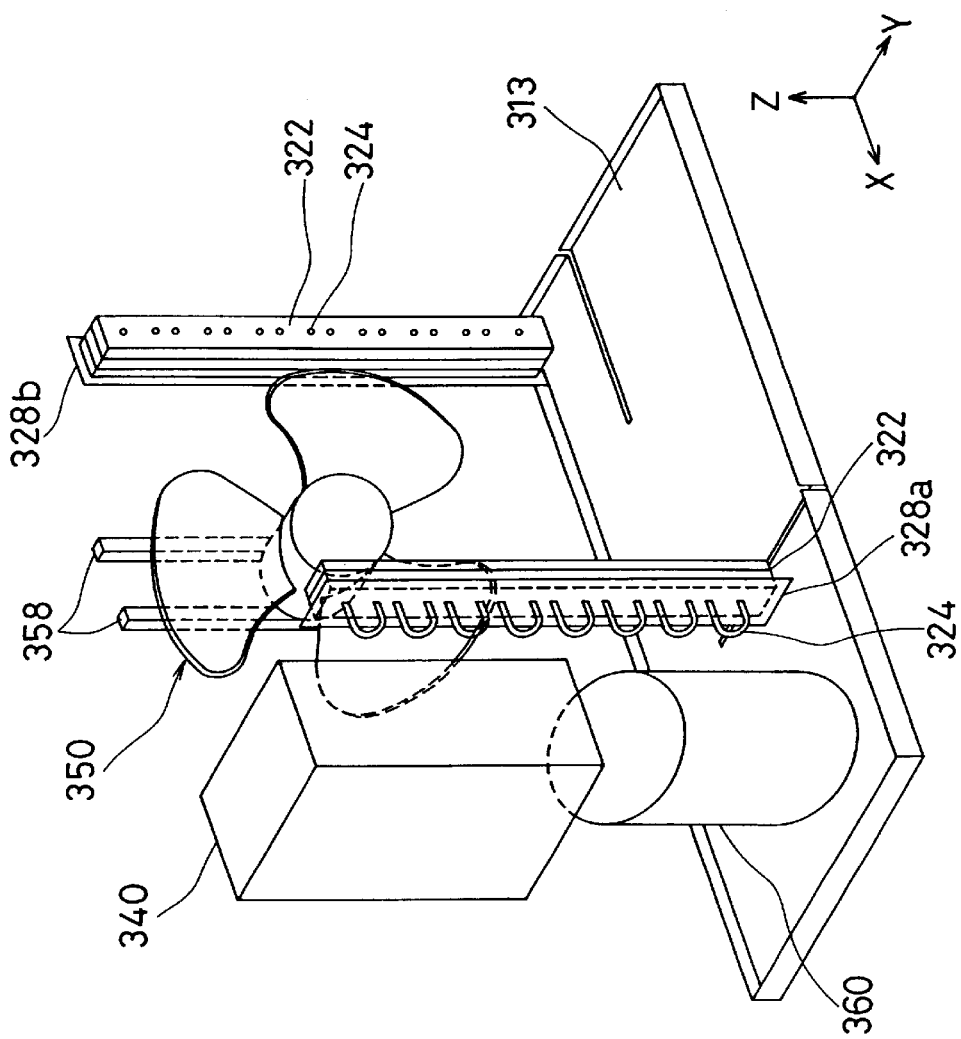
FIG. 22 is a perspective view showing how the housing of the outdoor unit further are cut and separated in such a manner as to leave a bottom plate.

Subsequently, the rotating unit 15 is moved while being rotated, for example, within the X-Y plane including the cutting line 372 so as to cut the housing 310 over the entire perimeter, thereby removing substantially the housing 310 except the bottom plate 313 as shown in FIG. 22. Thereafter, the blower 350, the controller 340 and the compressor 360 are separated from the bottom plate 313 as necessary. Such a separation may be performed using the above-described cutting device or by other known methods.

Examples of dimensions and materials of the rotors and the impacting bodies of the cutting device 10 are described. It should be noted here that the following is a specific example in the case of using the impacting bodies 120 (see FIGS. 6A and 6B) instead of the impacting bodies 100. The disc 11 has a diameter of 200 mm and a plate thickness of 25 mm and is made of carbon steel for machine structural use. The spindle 13 has a diameter of 25 mm and is made of carbon steel for machine structural use or carbon tool steel (JIS code: SK2). The impacting body 120 has a total length L0 of 200 mm and a length L1 from substantially the center of the through hole 123 to the end of the cutting blade 121 of 170 mm as shown in FIGS. 6A and 6B, the through hole 123 thereof has an inner dimension along its lengthwise direction of 32 mm and that along its widthwise direction of 28 mm, and the floating portion 125 and the peripheral portion 122 of the through hole 123 have a thickness of 5 mm and 30 mm, respectively. In the present example, the through hole 124 is not provided in the floating portion 125. The impacting body 120 is made of any one material selected from carbon steel for machine structural use (S45C), carbon tool steel (SK2), high speed tool steel (SKH2), Ni—Cr steel (SNC631), Ni—Cr—Mo steel (SNCM420), Cr—Mo steel (SCM430), chromium steel (SCr430) and manganese steel for machine structural use (SMn433).

In the cutting example shown in FIGS. 17A to 17D through FIG. 22, the disc 11 was rotated at 17200 rpm in the arrow 19 direction. The impact velocity of the impacting bodies 120 against the outdoor unit was set to be about 418 m/second (1505 km/hour). In this case, the impacting frequency was (17200 rotations/minute)×four impacting bodies=68800 times/minute. The feed speed of the cutting device 10 was adjusted suitably by monitoring the cutting states and set to be about 50 to 200 mm/second.

The housing 310 was made of a steel plate with a thickness of about 1 mm. By using the above-described cutting device 10 and allowing the impacting bodies 120 to impact on the housing 310 and the heat exchanger 320 at least at their critical impact velocities, it was possible to cut the housing 310 and the heat exchanger (the metal sheets 322 were made of aluminum, and the metal pipes 324 were made of copper) therein at the same time.

Although the first cutting device 10 was used in the above cutting example, the second cutting device 20 also can be used for cutting. In such cases, for example, the housing 310 can be cut with the first rotating unit 35 in which a circular path of the tip of the impacting body has a smaller radius, and then the internal structure (for example, the heat exchanger 320) can be cut with the second rotating unit 15 in which the circular path of the tip of the impacting body has a larger radius. In this case, it is preferable that the rotating units 35, 15 are rotated so that the impacting bodies 110 of the first rotating unit 35 impact on the housing 310 at least at its critical impact velocity and the impacting bodies 100 of the second rotating unit 15 impact on the internal structure (for example, the heat exchanger 320) at least at its critical impact velocity.

(Second Embodiment)

The following is a description of an exemplary method for disassembling an indoor unit of an air conditioner according to the present invention, with reference to accompanying drawings.

Figure 23:
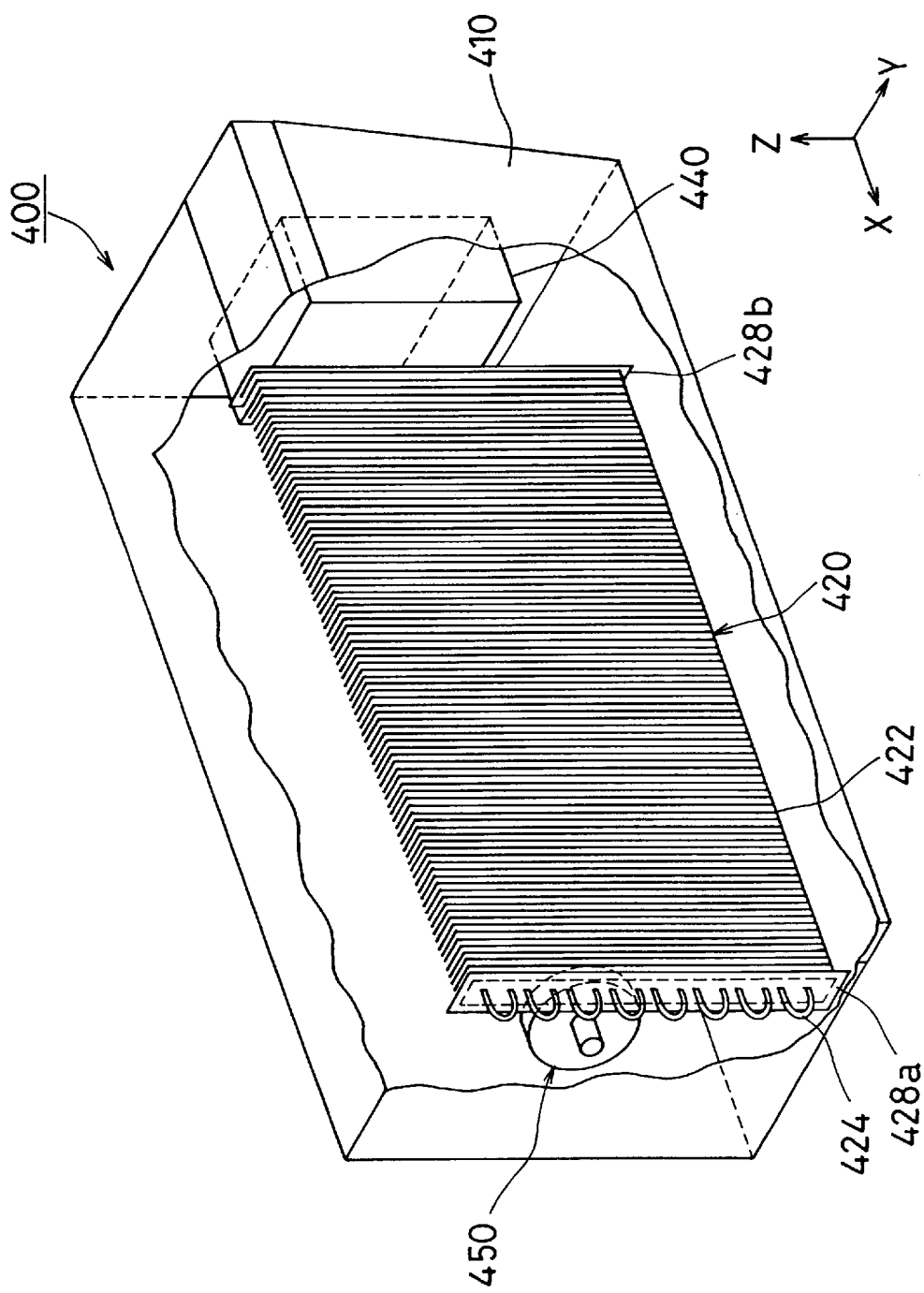
FIG. 23 is a partially broken perspective view showing a schematic configuration of an indoor air conditioner unit.
Figure 24B:
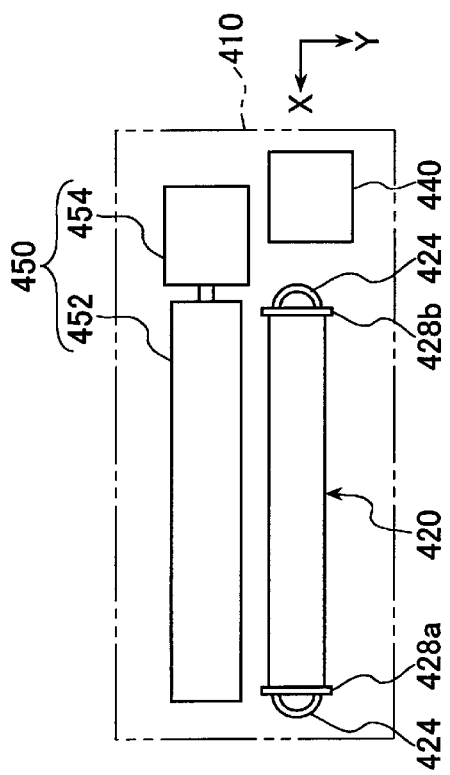
FIGS. 24A to 24C are views showing a schematic configuration of the indoor air conditioner unit, with FIG. 24A being a front view, FIG. 24B being a top view and FIG. 24C being a left side view.
Figure 24A:
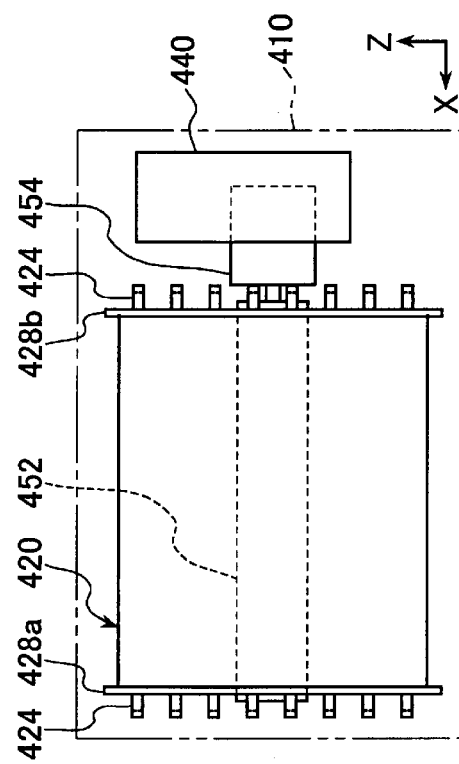
Figure 24C:
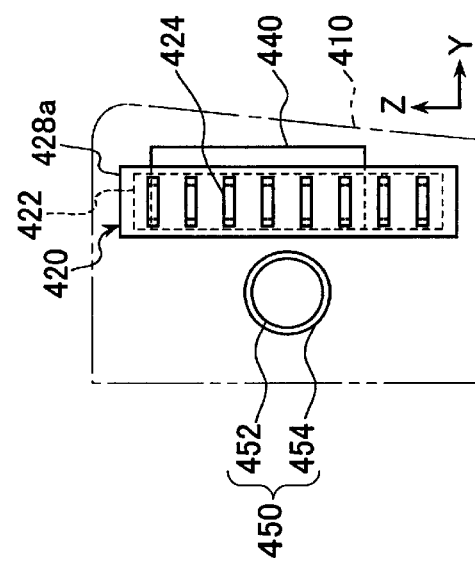

FIG. 23 is a perspective view showing a schematic configuration of the indoor air conditioner unit, in which a part of a housing is cut away so as to illustrate its internal structure clearly. FIGS. 24A to 24C also show a schematic configuration of the indoor air conditioner unit, with FIG. 24A being a front view, FIG. 24B being a top view and FIG. 24C being a left side view. In FIGS. 24A to 24C, for the purpose of illustrating its internal structure clearly, the housing is indicated by a chain double-dashed line and main elements therein are indicated by solid lines. For convenience of description in the following, an X-Y-Z rectangular coordinate system is defined as shown in FIG. 23, FIGS. 24A to 24C. When the indoor unit is seen from the front side, an X-axis corresponds to the horizontal direction, a Y-axis corresponds to the depth direction and a Z-axis corresponds to the vertical direction, with a direction in which each arrow faces indicating a forward direction.

As shown in FIG. 23, FIGS. 24A to 24C, an indoor unit 400 has a housing 410 containing a heat exchanger 420, a controller 440 and a blower 450.

Figure 25B:
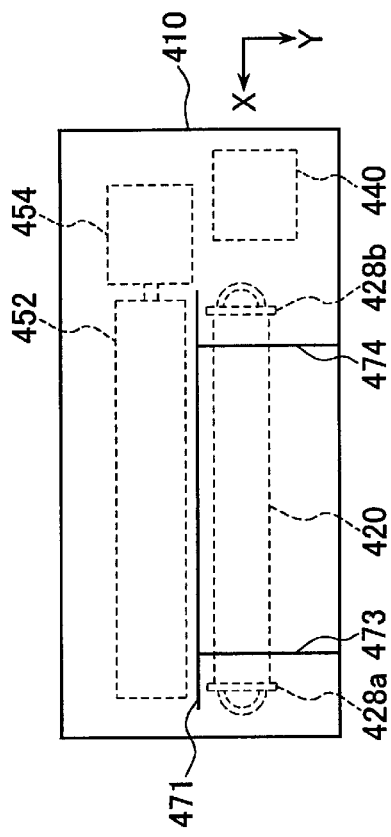
FIGS. 25A to 25C are views showing a cutting order of the indoor unit according to a second embodiment, with FIG. 25A being a front view, FIG. 25B being a top view and FIG. 25C being a left side view.
Figure 25A:
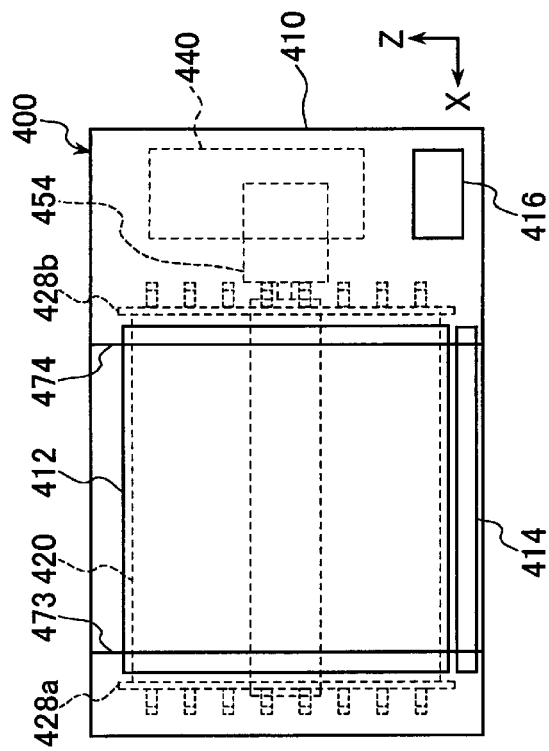
Figure 25C:
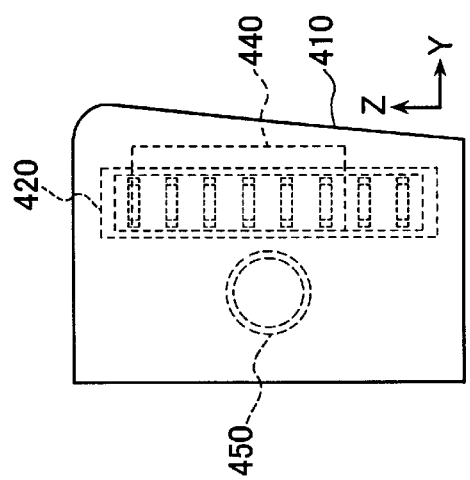

The housing 410 is formed by joining metal plates or resin plates into a substantially rectangular parallelepiped shape, and a front side thereof is provided with an inlet portion 412 for taking in the air in the room, an outlet portion 414 for blowing out the taken-in air via the blower 450 and a display portion 416 for displaying an operation state (see FIGS. 25A to 25C).

The heat exchanger 420 has many substantially rectangular metal sheets 422 that are made of a material such as aluminum and arranged at a predetermined spacing from one another and metal pipes 424 that are made of a material such as copper and penetrate these metal sheets. The metal sheets 422 efficiently exchange heat between a refrigerant gas running through the metal pipes 424 and the air in the room. This heat exchanger 420 is supported by support plates 428a, 428b at both ends and fixed to the housing 410.

The controller 440 controls an operation of the blower 450 and outputs/inputs controlling signals with respect to the controller 340 of the outdoor unit 300, and is constituted mainly by a printed circuit board and various kinds of electronic components mounted thereon. The controller 440 is held within the housing 410 by using a jig, which is not shown in the drawing.

The blower 450 includes a fan 452 with a cylindrical outer shape arranged so as to face the heat exchanger 420 and a motor 454 for rotating the fan 452. The blower 450 is held within the housing 410 by a jig, which is not shown in the drawing.

A method for disassembling a discarded indoor unit 400 having a structure as above will be described in the following.

FIGS. 25A to 25C show an example of a cutting order. FIG. 25A is a front view, FIG. 25B is a top view, and FIG. 25C is a left side view.

First, the first cutting device 10 is moved in the X-axis direction while being rotated within the X-Z plane, thereby incising the upper surface of the housing 410 along a cutting line 471. Similarly, the lower surface of the housing 410 is incised along a cutting line 472 (see FIG. 28). It is preferable that the cutting lines 471, 472 are positioned on a back side (on a backward side of the Y-axis) of the heat exchanger 420 with respect to the Y-axis direction. It also is preferable that the cutting lines 471, 472 are positioned with respect to the X-axis direction so as to cover at least the position of the heat exchanger 420 with respect to the X-axis direction. Although it is difficult to judge the location of the heat exchanger 420 accurately from outside of the housing, 410, an approximate location of the heat exchanger 420 can be estimated from the positions of the inlet portion 412 and the outlet portion 414 provided on the front side.

Thereafter, the front plate is cut vertically (in the Z-axis direction) along the cutting lines 473, 474.

Figure 26:
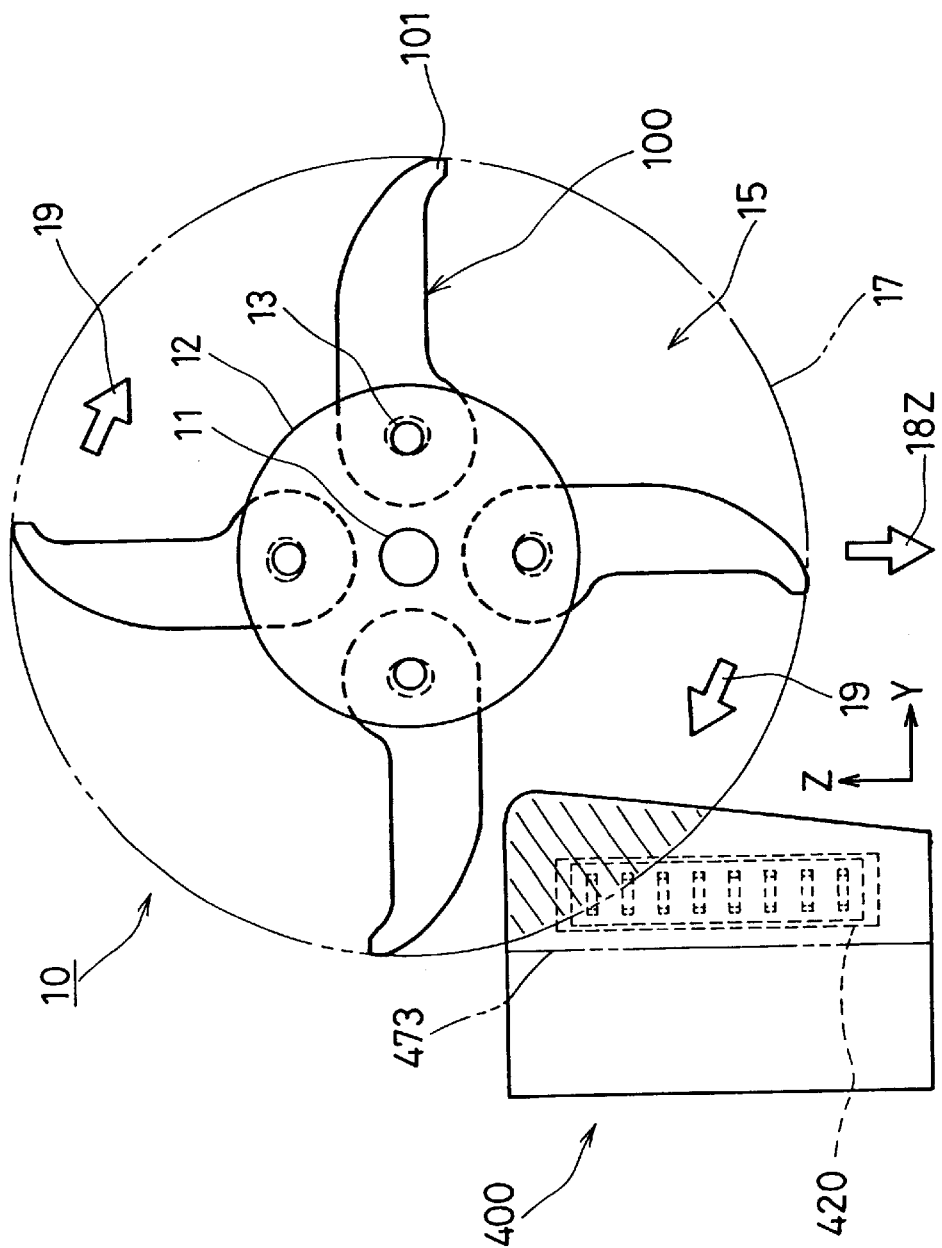
FIG. 26 is a left side view showing how a front plate of the indoor unit is cut vertically using the first cutting device.
Figure 27:
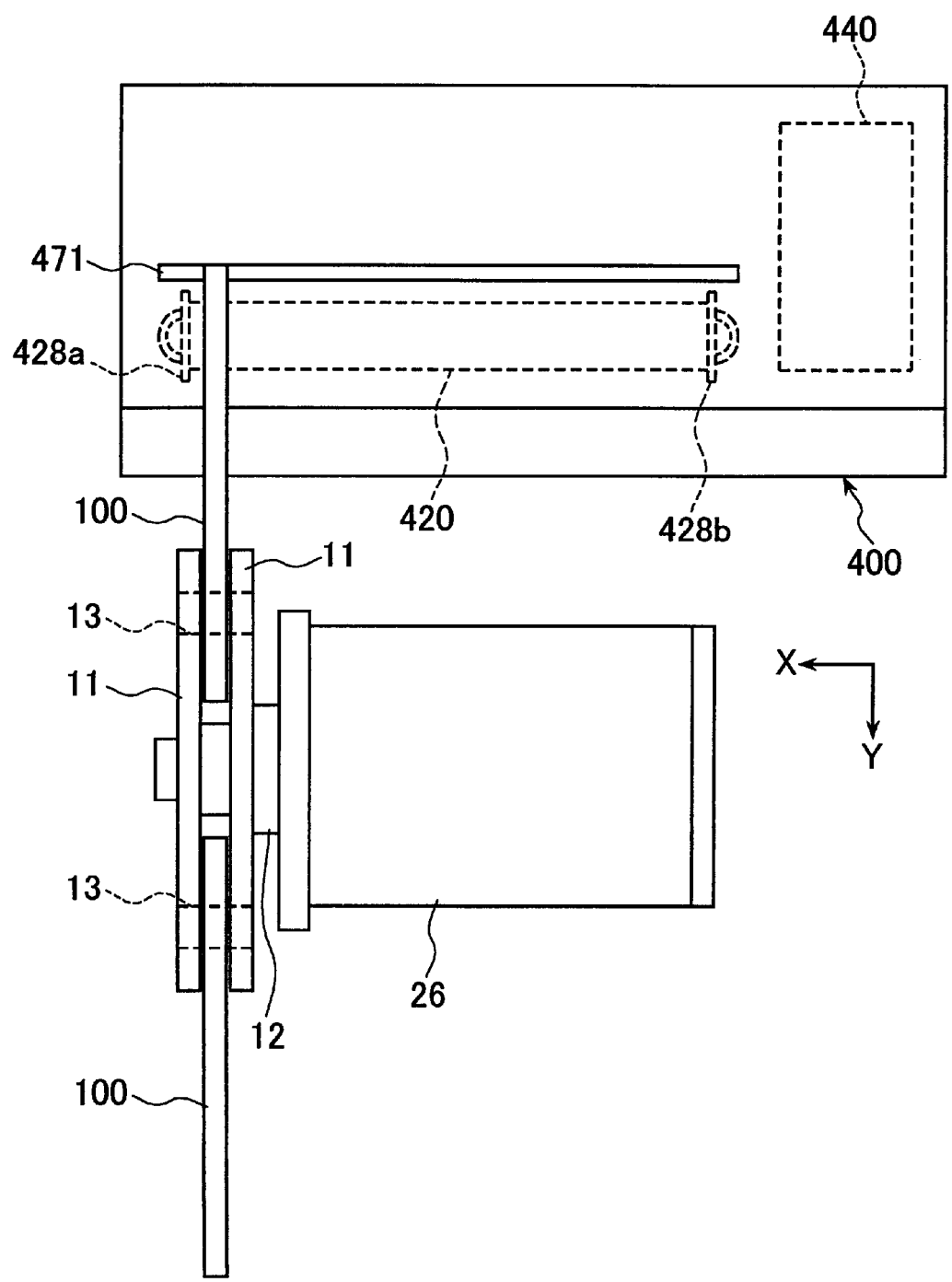
FIG. 27 is a top view showing how the front plate of the indoor unit is cut vertically using the first cutting device.

FIG. 26 is a left side view showing how the indoor unit 400 is cut along the cutting line 473 using the first cutting device 10. FIG. 27 is a top side view showing how the indoor unit 400 is cut along the cutting line 473 using the first cutting device 10. The cutting device 10 is moved in the arrow 18z direction (a backward direction of the Z-axis) at a predetermined speed while the rotating unit 15 is rotated in the arrow 19 direction such that the tip 101 of the impacting body 100 of the cutting device 10 rotates within a Z-Y plane. In FIG. 27, numeral 26 denotes a motor for rotating the rotating unit 15.

It is preferable that the cutting line 473 is positioned close to and on an inner side (on a backward side of the X-axis) of the support plate 428a of the heat exchanger 420 with respect to the X-axis direction. It also is preferable that the cutting line 474 is positioned close to and on an inner side (on a forward side of the X-axis) of the support plate 428b of the heat exchanger 420 with respect to the X-axis direction. Although it is difficult to judge the location of the heat exchanger 420 accurately from outside of the housing 410, an approximate location of the heat exchanger 420 can be estimated from the positions of the inlet portion 412 and the outlet portion 414 provided on the front side. In addition, it is preferable that the cutting depth with respect to the Y-axis direction approximately extends to the position allowing at least the heat exchanger 420 to be cut completely and further preferable that the cutting depth can cross the above described cutting lines 471, 472.

Figure 28:
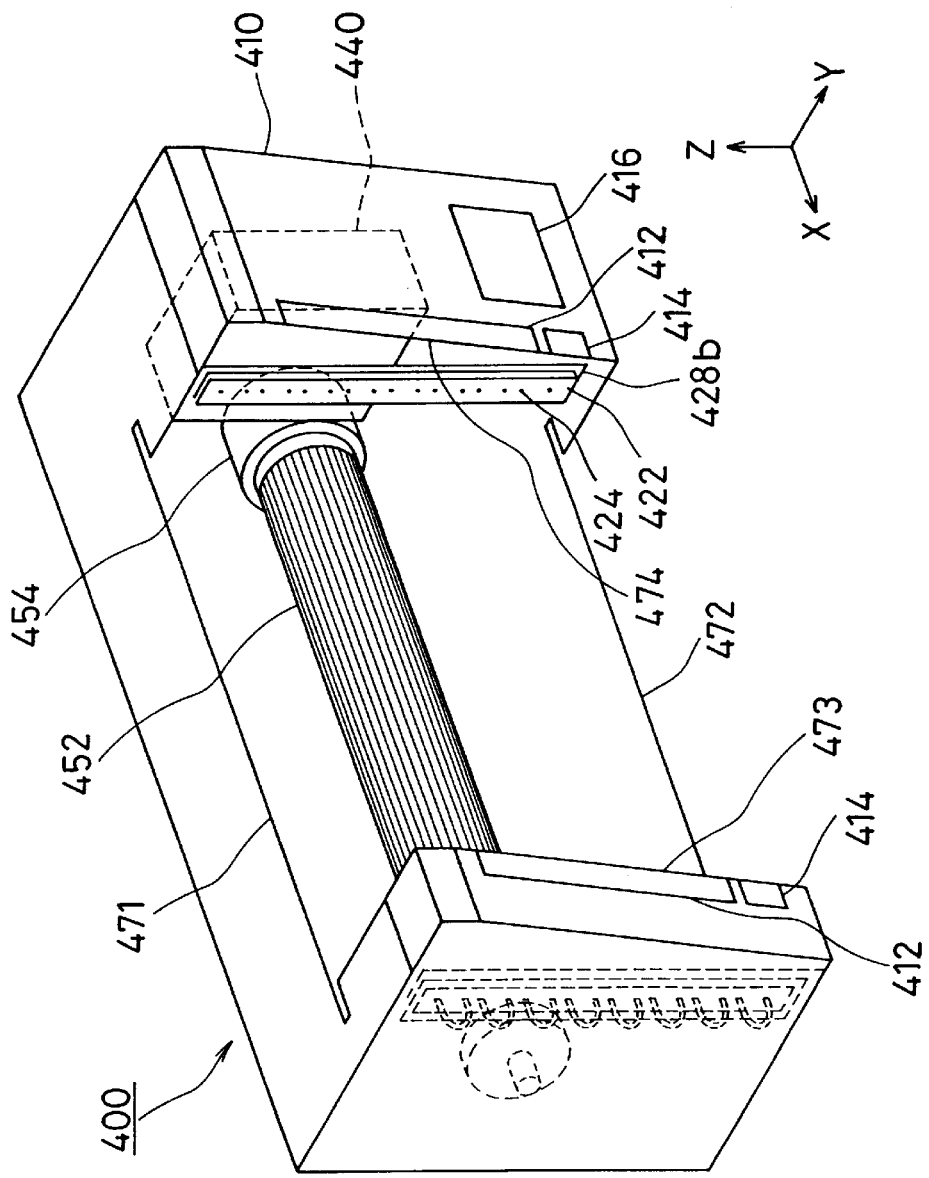
FIG. 28 is a perspective view showing how a part of a housing and a heat exchanger of the indoor unit are cut and separated.

When the cutting along the cutting line 474 is finished, a part of the front plate of the housing 410 with an U-shaped cross-section is cut out at the same time, and the heat exchanger 420 inside also is cut away so as to leave the support plates 428a, 428b, as shown in FIG. 28.

Thereafter, the blower 450 and the controller 440 are separated from the housing 410 as necessary. Such a separation may be performed using the above-described cutting device or by other known methods.

Examples of dimensions and materials of the rotors and the impacting bodies of the cutting device 10 are described. It should be noted here that the following is a specific example in the case of using the impacting bodies 120 (see FIGS. 6A and 6B) instead of the impacting bodies 100. The disc 11 has a diameter of 200 mm and a plate thickness of 25 mm and is made of carbon steel for machine structural use. The spindle 13 has a diameter of 25 mm and is made of carbon steel for machine structural use or carbon tool steel (JIS code: SK2). The impacting body 120 has a total length L0 of 200 mm, a length L1 from substantially the center of the through hole 123 to the end of the cutting blade 121 of 170 mm as shown in FIGS. 6A and 6B, the through hole 123 thereof has an inner dimension along its lengthwise direction of 32 mm and that along its widthwise direction of 28 mm, and the floating portion 125 and the peripheral portion 122 of the through hole 123 have a thickness of 5 mm and 30 mm, respectively. In the present example, the through hole 124 is not provided in the floating portion 125. The impacting body 120 is made of any one material selected from carbon steel for machine structural use (S45C), carbon tool steel (SK2), high speed tool steel (SKH2), Ni—Cr steel (SNC631), Ni—Cr—Mo steel (SNCM420), Cr—Mo steel (SCM430), chromium steel (SCr430) and manganese steel for machine structural use (SMn433).

In the cutting example shown in FIGS. 25A to 25C through FIG. 28, the disc 11 was rotated at 17200 rpm in the arrow 19 direction. The impact velocity of the impacting bodies 120 against the indoor unit was set to be about 418 m/second (1505 km/hour). In this case, the impacting frequency was (17200 rotations/minute)×four impacting bodies=68800 times/minute. The feed speed of the cutting device 10 was adjusted suitably by monitoring the cutting states and set to be about 50 to 200 mm/second.

The housing 410 was made of a steel plate with a thickness of about 1 mm. By using the above-described cutting device 10 and allowing the impacting bodies 120 to impact on the housing 410 and the heat exchanger 420 at least at their critical impact velocities, it was possible to cut the housing 410 and the heat exchanger (the metal sheets 422 were made of aluminum, and the metal pipes 424 were made of copper) therein at the same time.

Although the first cutting device 10 was used in the above cutting example, the second cutting device 20 also can be used for cutting. In such cases, for example, the housing 410 can be cut with the first rotating unit 35 in which a circular path of the tip of the impacting body has a smaller radius, and then the internal structure (for example, the heat exchanger 420) can be cut with the second rotating unit 15 in which the circular path of the tip of the impacting body has a larger radius. In this case, it is preferable that the rotating units 35, 15 are rotated so that the impacting bodies 110 of the first rotating unit 35 impact on the housing 410 at least at its critical impact velocity and the impacting bodies 100 of the second rotating unit 15 impact on the internal structure (for example, the heat exchanger 420) at least at its critical impact velocity.

Figure 29:
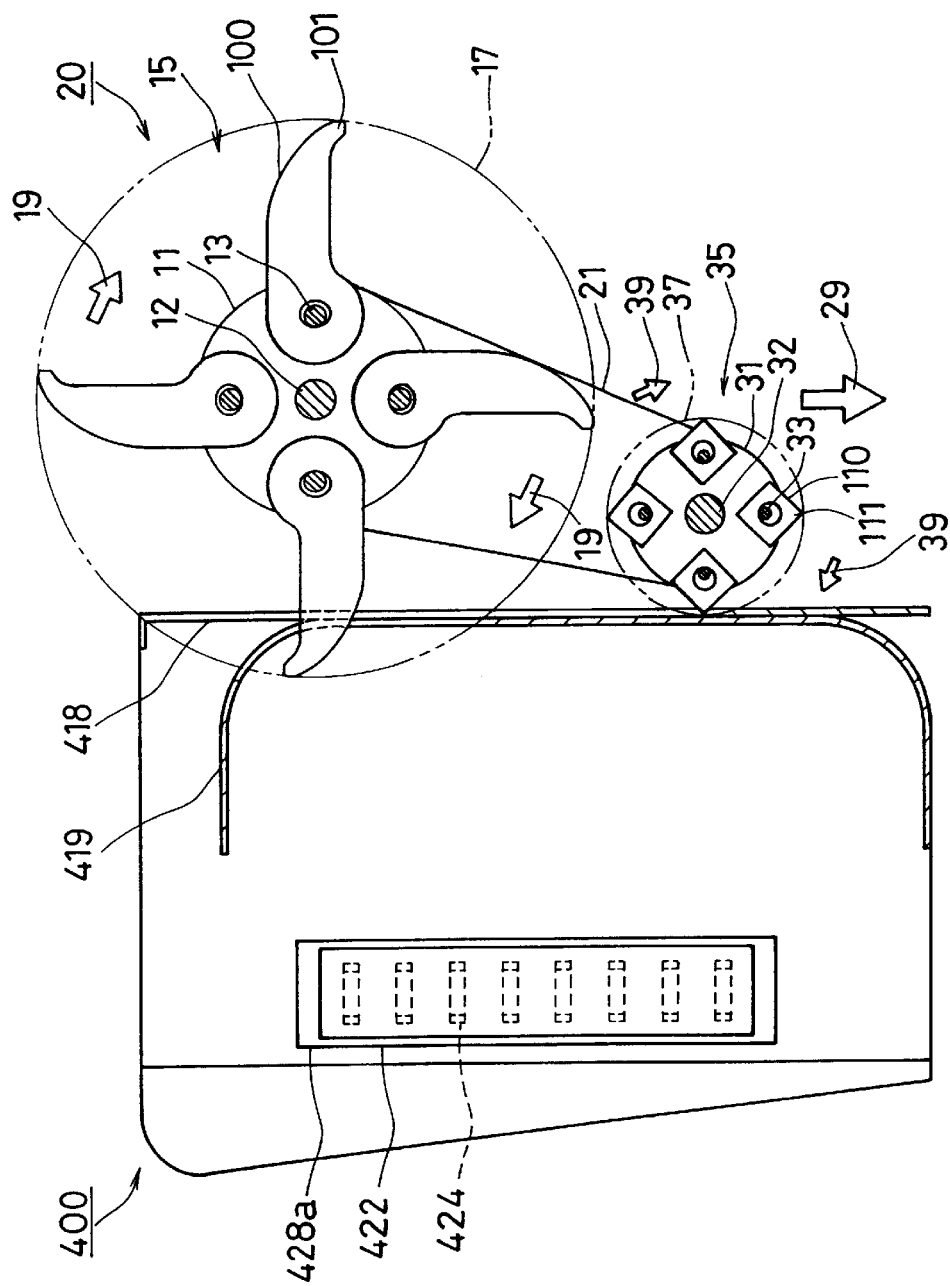
FIG. 29 is a right-side sectional view showing how a back side of the indoor unit is cut vertically using a second cutting device.

Furthermore, when cutting a layered portion of the steel plate, the second cutting device 20 provided with the two rotating units is particularly useful. For example, as shown in FIG. 29, there is a case where a wall-hung steel base 418 on a back side (a wall side) of the indoor unit 400 and a steel ventilation wall 419 for holding the blower and forming an air passage are layered into one piece. Since the steel generally has a high critical impact velocity, the following problem arises when attempting to cut this thick portion at one time with one cutting unit. That is, in order to respond to the high critical impact velocity, the rotating unit has to be rotated at a higher speed. Also, in order to respond to the large thickness, the cutting depth needs to be greater, in other words, the projecting length of the impacting body beyond the rotor (the disc) needs to be larger. When the rotational speed of the rotating unit is raised, the centrifugal force generated in the impacting body becomes greater. Moreover, when the projecting length of the impacting body is extended, the weight and radius of gyration of the impacting body increase, leading to a still greater centrifugal force. In order to resist such a large centrifugal force, it becomes necessary to improve a mechanical strength of the rotating unit, causing a cost increase. Furthermore, when attempting to cut the thick steel layered body at one time with only the first cutting device 10 provided with the substantially bow-shaped impacting bodies 100, the impact on the steel plate 418 causes each impacting body 100 to rebound and rotate about the spindle 13 and then interfere with the impacting body 100 positioned toward the back in the rotational direction, which is supposed to impact on the steel plate subsequently. Also, the speed of the impacting body 100 lowers at some midpoint in the thickness direction of the steel plate, and then this impacting body interferes with the subsequent impacting body 100 within the steel plate. Such interferences between the impacting bodies deteriorate the cutting efficiency and the reliability of the cutting device. When the intervals between the impacting bodies are increased for the purpose of preventing the interference therebetween, the number of the impacting bodies declines, leading to fewer impacting times and lower cutting efficiency. Therefore, the steel plate is cut with the second cutting device 20 by sequentially increasing the cutting depth using a plurality of the rotating units, thereby achieving an excellent cutting performance with respect to a thick part to be cut.

Simply changing the heights of the axes of rotation (the main shafts) of the rotating units while keeping their configurations completely the same also can increase sequentially the cutting depths of a plurality of these rotating units. However, when cutting the layered part of the steel plates 418, 419 described above, it is preferable to use the second cutting device 20 so that the impacting bodies 110 of the first rotating unit 35 cut the steel plate 418 alone and the impacting bodies 100 of the subsequent second rotating unit 15 cut deeply to the back side of the steel plate 419. In other words, it is preferable that, in order to change the cutting depth of the impacting body of each rotating unit, the circular paths 37, 17 of the tips of the cutting blades of the impacting bodies of these rotating units are made different and the distances from the surface of a workpiece (the housing 410) to the main shafts 32, 12 are changed. This makes it possible to achieve a high-speed rotation of at least the first rotating unit 35 easily.

Examples of dimensions and materials of the rotors and the impacting bodies of the second cutting device 20 are described. It should be noted here that the following is a specific example in the case of using the impacting bodies 120 (see FIGS. 6A and 6B) instead of the impacting bodies 100. The disc 31 has a diameter of 100 mm and a plate thickness of 5 mm and is made of carbon steel for machine structural use, and the disc 11 has a diameter of 200 mm and a plate thickness of 25 mm and is made of carbon steel for machine structural use. The spindle 33 has a diameter of 10 mm and is made of carbon steel for machine structural use or carbon tool steel (JIS code: SK2), and the spindle 13 has a diameter of 25 mm and is made of carbon steel for machine structural use or carbon tool steel (JIS code: SK2). The impacting body 110 has a square plate member with each side of 34.2 mm and a thickness of 5 mm, a cylindrical member 112 with an outer diameter 25 mm and a length of 10 mm and the through hole 113 with an inner diameter of 17 mm. The impacting body 120 has a total length L0 of 200 mm, a length L1 from substantially the center of the through hole 123 to the end of the cutting blade 121 of 170 mm as shown in FIGS. 6A and 6B, the through hole 123 thereof has an inner dimension along its lengthwise direction of 32 mm and that along its widthwise direction of 28 mm, and the floating portion 125 and the peripheral portion 122 of the through hole 123 have a thickness of 5 mm and 30 mm, respectively. In the present example, the through hole 124 is not provided in the floating portion 125. The impacting bodies 110, 120 are made of any one material selected from carbon steel for machine structural use (S45C), carbon tool steel (SK2), high speed tool steel (SKH2), Ni—Cr steel (SNC631), Ni—Cr—Mo steel (SNCM420), Cr—Mo steel (SCM430), chromium steel (SCr430) and manganese steel for machine structural use (SMn433).

In the cutting example shown in FIG. 29, the disc 31 was rotated at 30000 rpm in a direction indicated by arrows 39, and the impact velocity of the impacting bodies 110 against the wall-hung base 418 (a steel plate having a thickness of 1 mm) as the top layer was set to be about 157 m/second (565 km/hour). Also, the disc 11 was rotated at 17200 rpm in the arrow 19 direction, and the impact velocity of the impacting bodies 120 against the ventilation wall 419 (a steel plate having a thickness of 1 mm) was set to be about 418 m/second (1505 km/hour). While the indoor unit 400 was kept fixed, the cutting device 20 was moved in a direction indicated by an arrow 29 (in parallel with the surface of the wall-hung base 418) at a cutting moving speed of 100 mm/second by controlling the robot arm 23. In this case, the impacting frequency for the impacting bodies 110 was (30000 rotations/minute)×four impacting bodies= 120000 times/minute, and that for the impacting bodies 120 was (17200 rotations/minute)×four impacting bodies=68800 times/minute.

Since the main shafts 32, 12 rotate at a high speed as described above, a great centrifugal force acts on the impacting bodies 110, 120. The centrifugal force causes a high-speed compressive force accompanied with impacts in a limited portion of the steel plate layers 418, 419 including the surface subjected to the impact by the cutting blades 111, 121 of the impacting bodies 110, 120 and the vicinity of the impact surface. Thus, the top layer of the impact surface of the steel plate layers 418, 419 is smashed at a high speed instantaneously. Cut scraps are in a minute granular state. It has been confirmed by a test that the steel plate layer can be cut even when no sharp cutting blade is provided.

In the example described above, two layers of the steel plates were cut with the first and second rotating units 35, 15 respectively. However, when cutting a composite body of materials with different critical impact velocities, for example, the layered body of the steel plate and the resin plate, at least the impacting bodies of the rotating unit that cuts the material with a higher critical impact velocity (for example, the steel plate) is allowed to impact at least at its critical impact velocity. In the material with a lower critical impact velocity (for example, the resin plate), even when the impacting bodies are allowed to impact on such a material at its critical impact velocity or lower, the fracture does not propagate widely and only the vicinity of the part subjected to the impact is smashed, in some cases. Thus, a stable cutting sometimes is possible even at the critical impact velocity or lower.

In the above, the impact velocities of the impacting bodies 110, 100 are not limited to the above-mentioned specific example and can be set freely depending on the kind of a workpiece, cutting conditions, or the like as long as at least one of them is at least the critical impact velocity of the workpiece (when the workpiece is formed of a layered body including a plurality of layers, the impact velocity of the impacting bodies cutting the layer that is most difficult to cut in view of physical properties such as hardness, brittleness and strength is considered to be at least at the critical impact velocity of the material for this layer). Similarly, the number of impacts by the impacting bodies 110, 100 per unit time also can be changed depending on the kind of a workpiece, cutting conditions, or the like.

The number of the rotating units is not limited to two as described above but may be three or more. If three or more rotating units are used and the workpiece is cut sequentially by increasing the cutting depth of the impacting bodies of these units as described above, such a workpiece can be cut excellently even when the workpiece is thick or has a multilayered structure. In such cases, it is preferable that the impacting bodies of these rotating units are allowed to impact on the workpiece at least at the critical impact velocity of each material of the workpiece to be cut by the respective units. However, as is already mentioned, there are some cases where, depending on a material of the workpiece, the workpiece can be cut without any problems even when not all the impacting bodies of a plurality of the rotating units is allowed to impact at least at the critical impact velocity.

For example, when the steel plate layer 418 as the top layer of the housing 410 is thick and thus the entire thickness thereof is difficult to cut at one time with the first rotating unit in the above example, a third rotating unit that has substantially the same configuration as the first rotating unit 35 is provided between the first rotating unit 35 and the second rotating unit 15. Then, the cutting depth is increased in the order of the first, third and second rotating units, thus cutting the steel plate layer 418 with the first rotating unit and the third rotating unit. In this case, it is needless to say that the impacting bodies of the first and third rotating units preferably are allowed to impact on the steel plate layer 418 at least at the critical impact velocity of the steel plate layer 418.

The cutting positions and cutting orders described in the above first and second embodiments are merely an example, and they can be changed suitably according to the structures of the outdoor unit and the indoor unit. For example, although the heat exchanger and the housing were cut at the same time by increasing the cutting depth in the above example, it also may be possible to cut the housing and separate at least a part thereof first and then check the internal structure, followed by cutting and separating the heat exchanger.

Furthermore, although the above embodiments showed the method for disassembling the air conditioner having a structure in which the outdoor unit and the indoor unit are separate, they also can be applied to the disassembly of an air conditioner having an integral structure in which the outdoor unit and the indoor unit are not separate.

(Third Embodiment)

Figure 30:
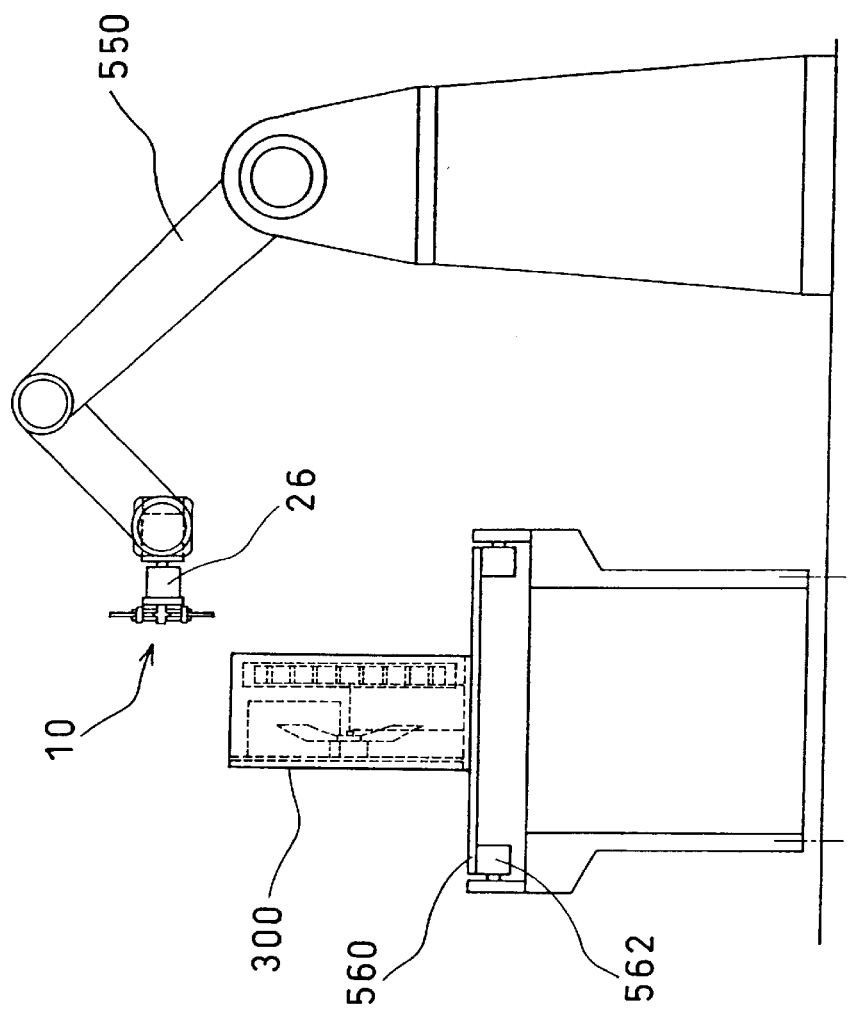
FIG. 30 is a side view showing how the outdoor unit is cut using cutting and processing equipment in which the first cutting device is mounted on an end of a robot arm.

FIG. 30 is a side view showing how the outdoor unit 300 is cut by using cutting and processing equipment in which the first cutting device 10 illustrated in the first embodiment is mounted to the tip of a robot arm.

In FIG. 30, numeral 300 indicates the outdoor unit serving as a workpiece, numeral 10 indicates the first cutting device described in the first embodiment, numeral 550 indicates a commercially available robot controlled with five axes, numeral 560 indicates a carrier pallet on which the outdoor unit 300 is loaded, and numeral 562 indicates a roller conveyor for carrying the carrier pallet 560. A driving motor 26 is attached to a jig at the tip of the arm of the robot 550, and its driving axis is connected with the main shaft 12 of the first cutting device 10 (see FIGS. 1A, 1B, 2A and 2B).

When the outdoor unit 300 loaded on the carrier pallet 560 arrives in front of the five-axes controlled robot 550, which is detected automatically, the cutting device 10 mounted to the arm of the robot 550 is rotated and driven. Thus, the outdoor unit 300 is cut and processed by the five-axes control function, for example, as described in FIGS. 17A to 17D though FIG. 22.

The above-mentioned equipment preferably is provided with a following control device (not shown in the figure). The control device detects at least one of an intrinsic oscillatory waveform and an intrinsic oscillation frequency that are caused by the impact of the impacting bodies of the cutting device 10 against the outdoor unit 300, the load on the driving motor 26 and an outer shape of the outdoor unit 300 and controls and changes at least one of the rotational speed of the rotating unit (the impact velocity of the impacting bodies) of the cutting device 10, a cutting depth and a relative speed (a feed speed) and a relative moving direction (for example, when the cutting is judged to be difficult, the cutting device 10 is reversed slightly) between the rotating unit and the outdoor unit 300. In this manner, even when the outdoor unit 300 is formed of a plurality of members with different physical properties, even when the material of the outdoor unit 300 is unknown, or even when the internal structure of the outdoor unit 300 that cannot be seen from the outside is unknown, optimum cutting conditions can be set automatically, thus achieving the automation of the cutting work.

In the above description, the cutting device 10 can be replaced with the second cutting device 20 illustrated in the second embodiment. In this case, the above-mentioned control device can be provided for each rotating unit. In other words, the control device detects at least one of an intrinsic oscillatory waveform and an intrinsic oscillation frequency that are caused by the impact of the impacting bodies against the outdoor unit 300, the load on the driving motor for rotating each rotating unit and an outer shape of the workpiece and change at least one of the rotational speed, a cutting depth and a relative speed and a relative moving direction between the rotating unit and the outdoor unit 300 for each of the rotating units. In this manner, it is possible to set an appropriate cutting condition for each rotating unit.

Furthermore, instead of mounting the cutting device 20 of the second embodiment including the first and second rotating units to one robot, it also is possible to provide a plurality of robots, each of which is provided with one rotating unit, and increase the cutting depth sequentially, thereby cutting into the outdoor unit 300 sequentially, for example.

In addition, it may be possible to arrange a plurality of robots along the roller conveyor 562 and mount the cutting device 10 or the cutting device 20 on each of the robots, thereby assigning a predetermined cutting position to each robot.

The indoor unit 400 can be cut in a manner similar to the above.

It is needless to say that the conveyor system may be a belt conveyor or a chain conveyor.

In addition, although the workpiece was cut by moving the cutting device while fixing the workpiece in the above example, it also may be cut by moving the workpiece while fixing the cutting device at a predetermined position.

The heat exchanger that has been disassembled and separated by the disassembling method of the present invention is separated into individual metal components (for example, copper and aluminum) and collected with known heat exchanger processing equipment. Also, the housing, the motor and fan in the blower, the circuit board and the compressor individually are separated as necessary, crushed and then collected.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A method for disassembling an air conditioner including a heat exchanger, comprising the process of:
    separating the heat exchanger from the air conditioner by cutting both ends of the heat exchanger;
    wherein the process of separating the heat exchanger uses a cutting device comprising:
        a rotor with a principal plane,
        a spindle provided in a normal direction to the principal plane, and
        at least one impacting body mounted on the spindle rotatably,
        wherein the impacting body is mounted so that a predetermined fitting gap is provided between the impacting body and the spindle and a part of a periphery of the impacting body can be positioned beyond a periphery of the rotor, and
    the separating process cuts/processes the heat exchanger by rotating the rotor at a high speed to allow the impacting body to impact on at least the heat exchanger at least at a critical impact velocity.

2. The method for disassembling an air conditioner according to claim 1, wherein the impacting body is allowed to impact on the heat exchanger at a speed of at least about 139 m/second (about 500 km/hour).

3. The method for disassembling an air conditioner according to claim 1, wherein the impacting body is allowed to impact on the heat exchanger at a speed of at least about 340 m/second (about 1224 km/hour).

4. The method for disassembling an air conditioner according to claim 1, wherein the impacting body is allowed to impact on the heat exchanger at a speed at least twice as high as the critical impact velocity of the heat exchanger.

5. The method for disassembling an air conditioner according to claim 1, wherein the impacting body cuts the heat exchanger by impacting on the heat exchanger to smash a surface thereof.

6. The method for disassembling an air conditioner according to claim 1, wherein the heat exchanger and a housing of the air conditioner are cut at the same time.

7. The method for disassembling an air conditioner according to claim 1, wherein the cutting device is mounted to an arm of a robot with a multi-axis control function.

8. The method for disassembling an air conditioner according to claim 1, wherein at least one of an intrinsic oscillatory waveform and an intrinsic oscillation frequency that are caused by an impact of the impacting body against the air conditioner, a load on a driving motor for rotating the rotor and an outer shape of the air conditioner is detected, and at least one of a rotational speed of the rotor, a cutting depth and a relative speed and a relative moving direction between the rotor and the air conditioner is changed.

9. The method for disassembling an air conditioner according to claim 1, further comprising the process of:
    cutting a housing and removing at least a part thereof;
    wherein the process of cutting the housing uses a cutting device comprising:
        a rotor with a principal plane,
        a spindle provided in a normal direction to the principal plane, and
        at least one impacting body mounted on the spindle rotatably,
    wherein the impacting body is mounted so that a predetermined fitting gap is provided between the impacting body and the spindle and a part of a periphery of the impacting body can be positioned beyond a periphery of the rotor, and
    the cutting process cuts/processes the housing by rotating the rotor at a high speed to allow the impacting body to impact on at least the housing at least at a critical impact velocity.

10. The method for disassembling an air conditioner according to claim 1, further comprising the process of:
    cutting a housing and removing at least a part thereof;
        wherein the process of cutting the housing uses a cutting device comprising at least a first rotating unit and a second rotating unit, each of these rotating units comprising:
        a rotor with a principal plane,
        a spindle provided in a normal direction to the principal plane, and
        at least one impacting body mounted on the spindle rotatably,
    wherein the impacting body is mounted so that a predetermined fitting gap is provided between the impacting body and the spindle and a part of a periphery of the impacting body can be positioned beyond a periphery of the rotor, and the cutting process allows the impacting body of the first rotating unit and the impacting body of the second rotating unit to impact on the housing sequentially while rotating the rotating units in a plane parallel to the principal plane of the rotor at a high speed and holding the first and second rotating units so that a circular path of a tip of the impacting body of the first rotating unit and a circular path of a tip of the impacting body of the second rotating unit during the rotation substantially are on the same plane, makes a cutting depth by the impacting body of the second rotating unit larger than that by the impacting body of the first rotating unit, and allows the impacting body of at least one of the rotating units to impact on the housing at least at a critical impact velocity, thereby cutting/processing the housing in a direction substantially parallel to the principal plane of the rotor.

11. A method for disassembling an air conditioner including a heat exchanger, comprising the process of:

separating the heat exchanger from the air conditioner by cutting both ends of the heat exchanger;

wherein the process of separating the heat exchanger uses a cutting device comprising at least a first rotating unit and a second rotating unit, each of these rotating units comprising:

a rotor with a principal plane, a spindle provided in a normal direction to the principal plane, and at least one impacting body mounted on the spindle rotatably, wherein the impacting body is mounted so that a predetermined fitting gap is provided between the impacting body and the spindle and a part of a periphery of the impacting body can be positioned beyond a periphery of the rotor, and the separating process allows the impacting body of the first rotating unit and the impacting body of the second rotating unit to impact on the air conditioner sequentially while rotating the rotating units in a plane parallel to the principal plane of the rotor at a high speed and holding the first and second rotating units so that a circular path of a tip of the impacting body of the first rotating unit and a circular path of a tip of the impacting body of the second rotating unit during the rotation substantially are on the same plane, makes a cutting depth by the impacting body of the second rotating unit larger than that by the impacting body of the first rotating unit, and allows the impacting body of at least one of the rotating units to impact on the heat exchanger at least at a critical impact velocity, thereby cutting/processing the heat exchanger in a direction substantially parallel to the principal plane of the rotor.

12. The method for disassembling an air conditioner according to claim 11, wherein the rotating units are provided on a common base.

13. The method for disassembling an air conditioner according to claim 11, wherein the impacting body has a different shape in each of the rotating units.

14. The method for disassembling an air conditioner according to claim 11, wherein the impacting body of at least one of the rotating units is allowed to impact on the heat exchanger at a speed of at least about 139 m/second (about 500 km/hour).

15. The method for disassembling an air conditioner according to claim 11, wherein the impacting body of at least one of the rotating units is allowed to impact on the heat exchanger at a speed of at least about 340 m/second (about 1224 km/hour).

16. The method for disassembling an air conditioner according to claim 11, wherein the impacting body of at least one of the rotating units is allowed to impact on the heat exchanger at a speed at least twice as high as the critical impact velocity of the heat exchanger.

17. The method for disassembling an air conditioner according to claim 11, wherein the impacting body that impacts on the heat exchanger at least at the critical impact velocity cuts the heat exchanger by impacting on the heat exchanger to smash a surface thereof.

18. The method for disassembling an air conditioner according to claim 11, wherein a housing of the air conditioner is cut by the first rotating unit and the heat exchanger is cut by the second rotating unit.

19. The method for disassembling an air conditioner according to claim 11, wherein at least one of an intrinsic oscillatory waveform and an intrinsic oscillation frequency that are caused by an impact of the impacting body against the air conditioner and a load on a driving motor for rotating the rotor is detected for each of the rotating units, and at least one of a rotational speed of the rotor, a cutting depth and a relative speed and a relative moving direction between the rotor and the air conditioner is changed for each of the rotating units.

20. The method for disassembling an air conditioner according to claim 11, wherein the heat exchanger and a housing of the air conditioner are cut at the same time.

21. The method for disassembling an air conditioner according to claim 11, wherein the cutting device is mounted to an arm of a robot with a multi-axis control function.

22. The method for disassembling an air conditioner according to claim 11, wherein at least one of an intrinsic oscillatory waveform and an intrinsic oscillation frequency that are caused by an impact of the impacting body against the air conditioner, a load on a driving motor for rotating the rotor and an outer shape of the air conditioner is detected, and at least one of a rotational speed of the rotor, a cutting depth and a relative speed and a relative moving direction between the rotor and the air conditioner is changed.

23. The method for disassembling an air conditioner according to claim 11, further comprising the process of:

cutting a housing and removing at least a part thereof;

wherein the process of cutting the housing uses a cutting device comprising:

a rotor with a principal plane, a spindle provided in a normal direction to the principal plane, and at least one impacting body mounted on the spindle rotatably, wherein the impacting body is mounted so that a predetermined fitting gap is provided between the impacting body and the spindle and a part of a periphery of the impacting body can be positioned beyond a periphery of the rotor, and the cutting process cuts/processes the housing by rotating the rotor at a high speed to allow the impacting body to impact on at least the housing at least at a critical impact velocity.

24. The method for disassembling an air conditioner according to claim 11, further comprising the process of:

cutting a housing and removing at least a part thereof;

wherein the process of cutting the housing uses a cutting device comprising at least a first rotating unit and a second rotating unit, each of these rotating units comprising:
a rotor with a principal plane,
a spindle provided in a normal direction to the principal plane, and
at least one impacting body mounted on the spindle rotatably, wherein the impacting body is mounted so that a predetermined fitting gap is provided between the impacting body and the spindle and a part of a periphery of the impacting body can be positioned beyond a periphery of the rotor, and the cutting process allows the impacting body of the first rotating unit and the impacting body of the second rotating unit to impact on the housing sequentially while rotating the rotating units in a plane parallel to the principal plane of the rotor at a high speed and holding the first and second rotating units so that a circular path of a tip of the impacting body of the first rotating unit and a circular path of a tip of the impacting body of the second rotating unit during the rotation substantially are on the same plane, makes a cutting depth by the impacting body of the second rotating unit larger than that by the impacting body of the first rotating unit, and allows the impacting body of at least one of the rotating units to impact on the housing at least at a critical impact velocity, thereby cutting/processing the housing in a direction substantially parallel to the principal plane of the rotor.

* * * * *